US008683698B2

(12) United States Patent
Pervan et al.

(10) Patent No.: US 8,683,698 B2
(45) Date of Patent: Apr. 1, 2014

(54) METHOD FOR MAKING FLOORBOARDS WITH DECORATIVE GROOVES

(75) Inventors: Darko Pervan, Viken (SE); Tony Pervan, Stockholm (SE)

(73) Assignee: Valinge Innovation AB, Viken (SE)

( * ) Notice: Subject to any disclaimer, the term of this patent is extended or adjusted under 35 U.S.C. 154(b) by 139 days.

(21) Appl. No.: 13/045,631

(22) Filed: Mar. 11, 2011

(65) Prior Publication Data

US 2011/0154665 A1 Jun. 30, 2011

Related U.S. Application Data

(63) Continuation of application No. 10/508,198, filed as application No. PCT/SE03/00471 on Mar. 20, 2003, now Pat. No. 7,926,234.

(30) Foreign Application Priority Data

Mar. 20, 2002 (SE) ........................ 0200848
Sep. 20, 2002 (SE) .................. PCT/SE02/01731

(51) Int. Cl.
*B23P 17/00* (2006.01)
*B21D 39/00* (2006.01)

(52) U.S. Cl.
USPC ............ 29/897.32; 29/521; 29/527.2; 52/581

(58) Field of Classification Search
USPC ........ 29/897.32, 897.3, 527.2, 521; 52/589.1, 52/588.1, 581, 578, 478, 391, 390, 177, 52/309.1, 592.2
See application file for complete search history.

(56) References Cited

U.S. PATENT DOCUMENTS

| 213,740 | A | 4/1879 | Conner |
| 714,987 | A | 12/1902 | Wolfe |
| 753,791 | A | 3/1904 | Fulghum |
| 1,124,228 | A | 1/1915 | Houston |
| 1,194,636 | A | 8/1916 | Joy |
| 1,371,856 | A | 3/1921 | Cade |
| 1,407,679 | A | 2/1922 | Ruthrauff |
| 1,454,250 | A | 5/1923 | Parsons |
| 1,468,288 | A | 9/1923 | Een |
| 1,477,813 | A | 12/1923 | Daniels et al. |
| 1,510,924 | A | 10/1924 | Daniels et al. |
| 1,540,128 | A | 6/1925 | Houston |
| 1,568,605 | A | 1/1926 | Hough |

(Continued)

FOREIGN PATENT DOCUMENTS

| AT | 218725 B | 12/1961 |
| AU | 713628 | 1/1998 |

(Continued)

OTHER PUBLICATIONS

Bergelin, Marcus, et al., U.S. Appl. No. 13/552,357 entitled "Resilient Groove," filed in the U.S. Patent and Trademark Office on Jul. 18, 2012.

(Continued)

*Primary Examiner* — Alexander P Taousakis
(74) *Attorney, Agent, or Firm* — Buchanan Ingersoll & Rooney P.C.

(57) ABSTRACT

Floorboards are shown, which consist of a core and a surface layer and are provided with decorative joint edges which are formed by removing the surface layer.

23 Claims, 11 Drawing Sheets

(56) References Cited

U.S. PATENT DOCUMENTS

| | | |
|---|---|---|
| 1,575,821 A | 3/1926 | Daniels |
| 1,602,256 A | 10/1926 | Sellin |
| 1,602,267 A | 10/1926 | Karwisch |
| 1,615,096 A | 1/1927 | Meyers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,660,480 A | 2/1928 | Daniels |
| 1,714,738 A | 5/1929 | Smith |
| 1,718,702 A | 6/1929 | Pfiester |
| 1,734,826 A | 11/1929 | Pick |
| 1,764,331 A | 6/1930 | Moratz |
| 1,778,069 A | 10/1930 | Fetz |
| 1,787,027 A | 12/1930 | Wasleff |
| 1,790,178 A | 1/1931 | Sutherland, Jr. |
| 1,809,393 A | 6/1931 | Rockwell |
| 1,823,039 A | 9/1931 | Gruner |
| 1,859,667 A | 5/1932 | Gruner |
| 1,898,364 A | 2/1933 | Gynn |
| 1,906,411 A | 5/1933 | Potvin |
| 1,929,871 A | 10/1933 | Jones |
| 1,940,377 A | 12/1933 | Storm |
| 1,953,306 A | 4/1934 | Moratz |
| 1,986,739 A | 1/1935 | Mitte |
| 1,988,201 A | 1/1935 | Hall |
| 2,026,511 A | 12/1935 | Storm |
| 2,044,216 A | 6/1936 | Klages |
| 2,082,186 A | 6/1937 | Staude |
| 2,266,464 A | 12/1941 | Kraft |
| 2,269,926 A | 1/1942 | Crooks |
| 2,276,071 A | 3/1942 | Scull |
| 2,306,295 A | 12/1942 | Casto |
| 2,324,628 A | 7/1943 | Kåhr |
| 2,398,632 A | 4/1946 | Frost et al. |
| 2,430,200 A | 11/1947 | Wilson |
| 2,495,862 A | 1/1950 | Osborn |
| 2,497,837 A | 2/1950 | Nelson |
| 2,679,231 A | 5/1954 | Pomper et al. |
| 2,740,167 A | 4/1956 | Rowley |
| 2,780,253 A | 2/1957 | Joa |
| 2,791,983 A | 5/1957 | Driskell |
| 2,811,133 A | 10/1957 | Heino |
| 2,851,740 A | 9/1958 | Baker |
| 2,865,058 A | 12/1958 | Andersson et al. |
| 2,872,712 A | 2/1959 | Brown et al. |
| 2,893,468 A | 7/1959 | Fieroh |
| 2,894,292 A | 7/1959 | Gramelspacher |
| 2,947,040 A | 8/1960 | Schultz |
| 3,045,294 A | 7/1962 | Livezey, Jr. |
| 3,050,758 A | 8/1962 | Wilkins |
| 3,100,556 A | 8/1963 | De Ridder |
| 3,120,083 A | 2/1964 | Dahlberg et al. |
| 3,125,138 A | 3/1964 | Bolenbach |
| 3,182,769 A | 5/1965 | De Ridder |
| 3,200,553 A | 8/1965 | Frashour et al. |
| 3,203,149 A | 8/1965 | Soddy |
| 3,247,638 A | 4/1966 | Gay, Jr. |
| 3,267,630 A | 8/1966 | Omholt |
| 3,282,010 A | 11/1966 | King, Jr. |
| 3,301,147 A | 1/1967 | Clayton et al. |
| 3,310,919 A | 3/1967 | Bue et al. |
| 3,339,525 A | 9/1967 | Roberts |
| 3,341,351 A | 9/1967 | Brewer |
| 3,347,048 A | 10/1967 | Brown |
| 3,354,867 A | 11/1967 | Pomper |
| 3,377,931 A | 4/1968 | Hilton |
| 3,387,422 A | 6/1968 | Wanzer |
| 3,440,790 A | 4/1969 | Nerem |
| 3,460,304 A | 8/1969 | Braeuninger et al. |
| 3,481,810 A | 12/1969 | Waite |
| 3,508,523 A | 4/1970 | De Meerleer et al. |
| 3,526,420 A | 9/1970 | Brancalcone |
| 3,538,665 A | 11/1970 | Gohner |
| 3,548,559 A | 12/1970 | Levine et al. |
| 3,553,919 A | 1/1971 | Omholt |
| 3,555,762 A | 1/1971 | Costanzo, Jr. |
| 3,579,941 A | 5/1971 | Tibbals |
| 3,627,608 A | 12/1971 | Steiner et al. |
| 3,694,983 A | 10/1972 | Couquet |
| 3,714,747 A | 2/1973 | Curran |
| 3,731,445 A | 5/1973 | Hoffmann et al. |
| 3,759,007 A | 9/1973 | Thiele |
| 3,768,846 A | 10/1973 | Hensley et al. |
| 3,786,608 A | 1/1974 | Boettcher |
| 3,825,381 A | 7/1974 | Dunning et al. |
| 3,842,562 A | 10/1974 | Daigle |
| 3,857,749 A | 12/1974 | Yoshida |
| 3,859,000 A | 1/1975 | Webster |
| 3,902,293 A | 9/1975 | Witt et al. |
| 3,908,053 A | 9/1975 | Hettich |
| 3,932,258 A | 1/1976 | Brinkman et al. |
| 3,936,551 A | 2/1976 | Elmendorf et al. |
| 3,988,187 A | 10/1976 | Witt et al. |
| 3,998,181 A | 12/1976 | Bellen et al. |
| 4,004,774 A | 1/1977 | Houston |
| 4,037,377 A | 7/1977 | Howell et al. |
| 4,054,477 A | 10/1977 | Curran |
| 4,076,880 A | 2/1978 | Geschwender |
| 4,084,996 A | 4/1978 | Wheeler |
| 4,090,338 A | 5/1978 | Bourgade |
| 4,099,358 A | 7/1978 | Compaan |
| 4,100,710 A | 7/1978 | Kowallik |
| 4,102,975 A | 7/1978 | Doerer |
| 4,147,448 A | 4/1979 | Jeffery |
| 4,169,688 A | 10/1979 | Toshio |
| RE30,233 E | 3/1980 | Lane et al. |
| 4,227,430 A | 10/1980 | Jansson et al. |
| 4,242,390 A | 12/1980 | Nemeth |
| 4,290,248 A | 9/1981 | Kemerer et al. |
| 4,299,070 A | 11/1981 | Oltmanns |
| 4,304,083 A | 12/1981 | Anderson |
| 4,426,820 A | 1/1984 | Terbrack |
| 4,471,012 A | 9/1984 | Maxwell |
| 4,489,115 A | 12/1984 | Layman et al. |
| 4,501,102 A | 2/1985 | Knowles |
| 4,561,233 A | 12/1985 | Harter et al. |
| 4,567,706 A | 2/1986 | Wendt |
| 4,574,099 A | 3/1986 | Nixon |
| 4,612,074 A | 9/1986 | Smith et al. |
| 4,612,745 A | 9/1986 | Hovde |
| 4,641,469 A | 2/1987 | Wood |
| 4,643,237 A | 2/1987 | Rosa |
| 4,645,481 A | 2/1987 | Klapp |
| 4,646,494 A | 3/1987 | Saarinen et al. |
| 4,648,165 A | 3/1987 | Whitehorne |
| 4,653,242 A | 3/1987 | Ezard |
| 4,694,627 A | 9/1987 | Omholt |
| 4,703,597 A | 11/1987 | Eggemar |
| 4,715,162 A | 12/1987 | Brightwell |
| 4,716,700 A | 1/1988 | Hagemeyer |
| 4,738,071 A | 4/1988 | Ezard |
| 4,751,957 A | 6/1988 | Vaught |
| 4,769,963 A | 9/1988 | Meyerson |
| 4,819,932 A | 4/1989 | Trotter, Jr. |
| 4,822,440 A | 4/1989 | Hsu et al. |
| 4,831,806 A | 5/1989 | Niese |
| 4,845,907 A | 7/1989 | Meek |
| 4,850,838 A | 7/1989 | Wagner et al. |
| 4,905,442 A | 3/1990 | Daniels |
| 5,029,425 A | 7/1991 | Bogataj |
| 5,096,408 A | 3/1992 | Bielfeldt |
| 5,111,579 A | 5/1992 | Andersen |
| 5,113,632 A | 5/1992 | Hanson |
| 5,117,603 A | 6/1992 | Weintraub |
| 5,134,026 A | 7/1992 | Melcher |
| 5,148,850 A | 9/1992 | Urbanick |
| 5,165,816 A | 11/1992 | Parasin |
| 5,179,812 A | 1/1993 | Hill |
| 5,190,088 A | 3/1993 | Thomassen et al. |
| 5,213,819 A | 5/1993 | Bielfeldt |
| 5,216,861 A | 6/1993 | Meyerson |
| 5,253,464 A | 10/1993 | Nilsen |
| 5,271,564 A | 12/1993 | Smith |

(56) References Cited

U.S. PATENT DOCUMENTS

| | | |
|---|---|---|
| 5,286,545 A | 2/1994 | Simmons, Jr. |
| 5,295,341 A | 3/1994 | Kajiwara |
| 5,322,584 A | 6/1994 | Severson et al. |
| 5,333,429 A | 8/1994 | Cretti |
| 5,349,796 A | 9/1994 | Meyerson |
| 5,390,457 A | 2/1995 | Sjölander |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,540,025 A | 7/1996 | Takehara et al. |
| 5,560,569 A | 10/1996 | Schmidt |
| 5,567,497 A | 10/1996 | Zegler et al. |
| 5,570,554 A | 11/1996 | Searer |
| 5,582,906 A | 12/1996 | Romesberg et al. |
| 5,587,218 A | 12/1996 | Betz |
| 5,597,024 A | 1/1997 | Bolyard et al. |
| 5,613,894 A | 3/1997 | Delle Vedove |
| 5,618,602 A | 4/1997 | Nelson |
| 5,630,304 A | 5/1997 | Austin |
| 5,641,553 A | 6/1997 | Tingley |
| 5,653,099 A | 8/1997 | MacKenzie |
| 5,671,575 A | 9/1997 | Wu |
| 5,695,875 A | 12/1997 | Larsson et al. |
| 5,706,621 A | 1/1998 | Pervan |
| 5,755,068 A | 5/1998 | Ormiston |
| 5,768,850 A | 6/1998 | Chen |
| 5,797,237 A | 8/1998 | Finkell |
| 5,823,240 A | 10/1998 | Bolyard et al. |
| 5,827,592 A | 10/1998 | Van Gulik et al. |
| 5,858,160 A | 1/1999 | Piacente et al. |
| 5,860,267 A | 1/1999 | Pervan |
| 5,899,038 A | 5/1999 | Stroppiana |
| 5,900,099 A | 5/1999 | Sweet et al. |
| 5,925,211 A | 7/1999 | Rakauskas |
| 5,935,668 A | 8/1999 | Smith |
| 5,943,239 A | 8/1999 | Shamblin et al. |
| 5,968,625 A | 10/1999 | Hudson |
| 5,987,839 A | 11/1999 | Hamar et al. |
| 6,006,486 A | 12/1999 | Moriau et al. |
| 6,023,907 A | 2/2000 | Pervan |
| 6,029,416 A | 2/2000 | Andersson |
| 6,094,882 A | 8/2000 | Pervan |
| 6,101,778 A | 8/2000 | Martensson |
| 6,115,926 A | 9/2000 | Robell |
| 6,119,423 A | 9/2000 | Costantino |
| 6,126,883 A | 10/2000 | Troetscher et al. |
| 6,134,854 A | 10/2000 | Stanchfield |
| 6,146,252 A | 11/2000 | Martensson |
| 6,148,884 A | 11/2000 | Bolyard et al. |
| 6,173,548 B1 | 1/2001 | Hamar et al. |
| 6,180,211 B1 | 1/2001 | Held |
| 6,182,410 B1 | 2/2001 | Pervan |
| 6,203,653 B1 | 3/2001 | Seidner |
| 6,205,639 B1 | 3/2001 | Pervan |
| 6,209,278 B1 | 4/2001 | Tychsen |
| 6,216,403 B1 | 4/2001 | Belbeoc'h |
| 6,216,409 B1 | 4/2001 | Roy et al. |
| 6,247,285 B1 | 6/2001 | Moebus |
| 6,260,326 B1 * | 7/2001 | Muller-Hartburg .............. 52/601 |
| 6,314,701 B1 | 11/2001 | Meyerson |
| 6,324,803 B1 | 12/2001 | Pervan |
| 6,332,733 B1 | 12/2001 | Hamberger et al. |
| 6,339,908 B1 | 1/2002 | Chuang |
| 6,345,481 B1 | 2/2002 | Nelson |
| 6,363,677 B1 | 4/2002 | Chen et al. |
| 6,374,880 B2 | 4/2002 | Macpherson et al. |
| 6,385,936 B1 | 5/2002 | Schneider |
| 6,397,547 B1 | 6/2002 | Martensson |
| 6,401,415 B1 | 6/2002 | Garcia |
| 6,421,970 B1 | 7/2002 | Martensson et al. |
| 6,438,919 B1 | 8/2002 | Knauseder |
| 6,446,405 B1 | 9/2002 | Pervan |
| 6,490,836 B1 | 12/2002 | Moriau et al. |
| 6,497,079 B1 | 12/2002 | Pletzer et al. |
| 6,505,452 B1 | 1/2003 | Hannig et al. |
| 6,510,665 B2 | 1/2003 | Pervan |
| 6,516,579 B1 | 2/2003 | Pervan |
| 6,526,719 B2 | 3/2003 | Pletzer et al. |
| 6,532,709 B2 | 3/2003 | Pervan |
| 6,536,178 B1 | 3/2003 | Pålsson et al. |
| 6,606,834 B2 | 8/2003 | Martensson et al. |
| 6,617,009 B1 | 9/2003 | Chen et al. |
| 6,647,689 B2 | 11/2003 | Pletzer et al. |
| 6,647,690 B1 | 11/2003 | Martensson |
| 6,670,019 B2 | 12/2003 | Andersson |
| 6,672,030 B2 | 1/2004 | Schulte |
| 6,679,011 B2 | 1/2004 | Beck et al. |
| 6,684,592 B2 | 2/2004 | Martin |
| 6,715,253 B2 | 4/2004 | Pervan |
| 6,722,809 B2 | 4/2004 | Hamberger et al. |
| 6,763,643 B1 | 7/2004 | Martensson |
| 6,766,622 B1 | 7/2004 | Thiers |
| 6,769,218 B2 | 8/2004 | Pervan |
| 6,769,219 B2 | 8/2004 | Schwitte |
| 6,786,019 B2 | 9/2004 | Thiers |
| 6,802,166 B1 | 10/2004 | Gerhard |
| 6,833,039 B2 | 12/2004 | Andersen et al. |
| 6,854,235 B2 | 2/2005 | Martensson |
| 6,862,857 B2 | 3/2005 | Tychsen |
| 6,874,292 B2 | 4/2005 | Moriau et al. |
| 6,922,964 B2 | 8/2005 | Pervan |
| 6,933,043 B1 | 8/2005 | Son et al. |
| 7,003,925 B2 | 2/2006 | Pervan |
| 7,022,189 B2 | 4/2006 | Delle Vedove |
| 7,040,068 B2 | 5/2006 | Moriau et al. |
| 7,101,438 B2 | 9/2006 | Suzuki et al. |
| 7,137,229 B2 | 11/2006 | Pervan |
| 7,171,791 B2 | 2/2007 | Pervan |
| 7,356,971 B2 | 4/2008 | Pervan |
| 7,386,963 B2 | 6/2008 | Pervan |
| 7,444,791 B1 | 11/2008 | Pervan |
| 7,454,875 B2 | 11/2008 | Pervan et al. |
| 7,584,583 B2 | 9/2009 | Bergelin et al. |
| 7,637,068 B2 | 12/2009 | Pervan |
| 7,677,005 B2 | 3/2010 | Pervan |
| 7,757,452 B2 | 7/2010 | Pervan |
| 7,779,596 B2 | 8/2010 | Pervan |
| 7,841,144 B2 | 11/2010 | Pervan |
| 7,854,100 B2 | 12/2010 | Pervan et al. |
| 7,861,482 B2 | 1/2011 | Pervan et al. |
| 7,866,115 B2 | 1/2011 | Pervan et al. |
| 7,886,497 B2 | 2/2011 | Pervan |
| 7,908,815 B2 | 3/2011 | Pervan et al. |
| 7,926,234 B2 | 4/2011 | Pervan |
| 7,930,862 B2 | 4/2011 | Bergelin et al. |
| 8,042,484 B2 | 10/2011 | Pervan |
| 8,215,078 B2 | 7/2012 | Pervan |
| 8,261,504 B2 | 9/2012 | Håkansson |
| 8,323,016 B2 | 12/2012 | Jacobsson |
| 2001/0029720 A1 | 10/2001 | Pervan |
| 2002/0014047 A1 | 2/2002 | Thiers |
| 2002/0020127 A1 | 2/2002 | Thiers |
| 2002/0023702 A1 | 2/2002 | Kettler |
| 2002/0031646 A1 | 3/2002 | Chen et al. |
| 2002/0046528 A1 | 4/2002 | Pervan et al. |
| 2002/0056245 A1 * | 5/2002 | Thiers .......................... 52/589.1 |
| 2002/0069611 A1 | 6/2002 | Leopolder |
| 2002/0100231 A1 | 8/2002 | Miller et al. |
| 2002/0112433 A1 | 8/2002 | Pervan |
| 2002/0178673 A1 | 12/2002 | Pervan |
| 2002/0178674 A1 | 12/2002 | Pervan |
| 2002/0178682 A1 | 12/2002 | Pervan |
| 2002/0189183 A1 | 12/2002 | Ricciardelli |
| 2003/0009972 A1 | 1/2003 | Pervan et al. |
| 2003/0024199 A1 | 2/2003 | Pervan et al. |
| 2003/0033777 A1 | 2/2003 | Thiers et al. |
| 2003/0033784 A1 | 2/2003 | Pervan |
| 2003/0041545 A1 | 3/2003 | Stanchfield |
| 2003/0084636 A1 | 5/2003 | Pervan |
| 2003/0101674 A1 | 6/2003 | Pervan et al. |
| 2003/0115812 A1 | 6/2003 | Pervan |
| 2003/0115821 A1 | 6/2003 | Pervan |
| 2003/0159385 A1 | 8/2003 | Thiers |

(56) References Cited

U.S. PATENT DOCUMENTS

| | | |
|---|---|---|
| 2003/0196405 A1 | 10/2003 | Pervan |
| 2003/0233809 A1 | 12/2003 | Pervan |
| 2004/0016196 A1 | 1/2004 | Pervan |
| 2004/0031227 A1 | 2/2004 | Knauseder |
| 2004/0035077 A1 | 2/2004 | Martensson |
| 2004/0035078 A1 | 2/2004 | Pervan |
| 2004/0062937 A1 | 4/2004 | Lyons |
| 2004/0108625 A1 | 6/2004 | Moder et al. |
| 2004/0139678 A1 | 7/2004 | Pervan |
| 2004/0177584 A1 | 9/2004 | Pervan |
| 2004/0206036 A1 | 10/2004 | Pervan |
| 2004/0211143 A1 | 10/2004 | Hannig |
| 2004/0241374 A1 | 12/2004 | Thiers et al. |
| 2004/0244611 A1 | 12/2004 | Ramcke |
| 2004/0255541 A1 | 12/2004 | Thiers et al. |
| 2005/0034404 A1 | 2/2005 | Pervan |
| 2005/0034405 A1 | 2/2005 | Pervan |
| 2005/0102937 A1 | 5/2005 | Pervan |
| 2005/0138881 A1 | 6/2005 | Pervan |
| 2005/0160694 A1 | 7/2005 | Pervan |
| 2005/0166502 A1 | 8/2005 | Pervan et al. |
| 2005/0166514 A1 | 8/2005 | Pervan |
| 2005/0166516 A1 | 8/2005 | Pervan |
| 2005/0208255 A1 | 9/2005 | Pervan |
| 2005/0210810 A1 | 9/2005 | Pervan |
| 2006/0048474 A1 | 3/2006 | Pervan |
| 2006/0070333 A1 | 4/2006 | Pervan |
| 2006/0073320 A1 | 4/2006 | Pervan et al. |
| 2006/0075713 A1 | 4/2006 | Pervan et al. |
| 2006/0101769 A1 | 5/2006 | Pervan et al. |
| 2006/0117696 A1 | 6/2006 | Pervan |
| 2006/0179773 A1 | 8/2006 | Pervan |
| 2006/0196139 A1 | 9/2006 | Pervan |
| 2006/0236642 A1 | 10/2006 | Pervan |
| 2006/0260254 A1 | 11/2006 | Pervan |
| 2006/0283127 A1 | 12/2006 | Pervan |
| 2007/0119110 A1 | 5/2007 | Pervan |
| 2007/0159814 A1 | 7/2007 | Jacobsson |
| 2007/0175144 A1 | 8/2007 | Hakansson |
| 2007/0175148 A1 | 8/2007 | Bergelin |
| 2007/0175156 A1 | 8/2007 | Pervan et al. |
| 2008/0000179 A1 | 1/2008 | Pervan |
| 2008/0000183 A1 | 1/2008 | Bergelin |
| 2008/0000190 A1 | 1/2008 | Hakansson |
| 2008/0000417 A1 | 1/2008 | Pervan et al. |
| 2008/0028707 A1 | 2/2008 | Pervan |
| 2008/0034701 A1 | 2/2008 | Pervan |
| 2008/0066425 A1 | 3/2008 | Jacobsson et al. |
| 2008/0120938 A1 | 5/2008 | Jacobsson et al. |
| 2008/0134607 A1 | 6/2008 | Pervan et al. |
| 2008/0263975 A1 | 10/2008 | Mead |
| 2009/0155612 A1 | 6/2009 | Pervan et al. |
| 2010/0092731 A1 | 4/2010 | Pervan et al. |
| 2010/0300030 A1 | 12/2010 | Pervan et al. |
| 2011/0131901 A1 | 6/2011 | Pervan et al. |
| 2011/0146188 A1 | 6/2011 | Wallin |
| 2011/0154763 A1 | 6/2011 | Bergelin et al. |
| 2012/0233953 A1 | 9/2012 | Pervan et al. |
| 2012/0279154 A1 | 11/2012 | Bergelin et al. |
| 2013/0055950 A1 | 3/2013 | Pervan |
| 2013/0263546 A1 | 10/2013 | Pervan |

FOREIGN PATENT DOCUMENTS

| | | |
|---|---|---|
| AU | 200020703 A1 | 6/2000 |
| BE | 417526 | 9/1936 |
| BE | 0557844 | 6/1957 |
| BE | 1010339 A3 | 6/1998 |
| BE | 1010487 A6 | 10/1998 |
| CA | 991373 | 6/1976 |
| CA | 2226286 | 12/1997 |
| CA | 2252791 | 5/1999 |
| CA | 2289309 | 7/2000 |
| CA | 2 363 184 | 7/2001 |
| CH | 200949 | 1/1939 |
| CH | 211877 | 1/1941 |
| CH | 690 242 A5 | 6/2000 |
| CN | 2095236 U | 2/1992 |
| CN | 2106197 U | 6/1992 |
| CN | 1376230 A | 10/2002 |
| DE | 1 212 275 | 3/1966 |
| DE | 7102476 | 1/1971 |
| DE | 1 534 278 | 11/1971 |
| DE | 2 159 042 A1 | 6/1973 |
| DE | 22 05 232 A1 | 8/1973 |
| DE | 7402354 | 1/1974 |
| DE | 2 238 660 | 2/1974 |
| DE | 2 252 643 | 5/1974 |
| DE | 25 02 992 | 7/1976 |
| DE | 26 16 077 A1 | 10/1977 |
| DE | 29 17 025 | 11/1980 |
| DE | 30 41 781 A1 | 6/1982 |
| DE | 32 14 207 A1 | 11/1982 |
| DE | 32 46 376 C2 | 6/1984 |
| DE | 33 43 601 A1 | 6/1985 |
| DE | 86 04 004 | 6/1986 |
| DE | 35 12 204 A1 | 10/1986 |
| DE | 35 38 538 A1 | 5/1987 |
| DE | 35 44 845 A1 | 6/1987 |
| DE | 36 31 390 A1 | 12/1987 |
| DE | 40 02 547 A1 | 8/1991 |
| DE | 41 30 115 A1 | 3/1993 |
| DE | 41 34 452 A1 | 4/1993 |
| DE | 42 15 273 A1 | 11/1993 |
| DE | 42 42 530 A1 | 6/1994 |
| DE | 43 13 037 C1 | 8/1994 |
| DE | 93 17 191 U1 | 3/1995 |
| DE | 295 17 995 U1 | 3/1996 |
| DE | 296 01 133 U1 | 3/1996 |
| DE | 296 10 462 U1 | 10/1996 |
| DE | 296 18 318 U1 | 4/1997 |
| DE | 196 01 322 A1 | 5/1997 |
| DE | 297 10 175 U1 | 9/1997 |
| DE | 196 51 149 A1 | 6/1998 |
| DE | 197 09 641 A1 | 9/1998 |
| DE | 197 18 319 A1 | 11/1998 |
| DE | 197 18 812 A1 | 11/1998 |
| DE | 299 22 649 U1 | 4/2000 |
| DE | 199 07 939 C1 | 5/2000 |
| DE | 200 06 143 U1 | 7/2000 |
| DE | 200 01 225 U1 | 8/2000 |
| DE | 200 02 744 U1 | 9/2000 |
| DE | 199 25 248 A1 | 12/2000 |
| DE | 200 13 380 U1 | 12/2000 |
| DE | 200 17 461 U1 | 3/2001 |
| DE | 200 18 284 U1 | 3/2001 |
| DE | 100 01 248 A1 | 7/2001 |
| DE | 100 32 204 C1 | 7/2001 |
| DE | 100 08 166 A1 | 9/2001 |
| DE | 100 34 407 C1 | 10/2001 |
| DE | 100 44 016 A1 | 3/2002 |
| DE | 100 57 901 A1 | 6/2002 |
| DE | 202 05 774 U1 | 8/2002 |
| DE | 202 06 460 U1 | 8/2002 |
| EP | 0 248 127 A1 | 12/1987 |
| EP | 0 487 925 A1 | 6/1992 |
| EP | 0 623 724 A1 | 11/1994 |
| EP | 0 652 340 A1 | 5/1995 |
| EP | 0 665 347 A1 | 8/1995 |
| EP | 0 690 185 A1 | 1/1996 |
| EP | 0 698 162 B1 | 2/1996 |
| EP | 0 843 763 B1 | 5/1998 |
| EP | 0 849 416 A2 | 6/1998 |
| EP | 0 855 482 B1 | 7/1998 |
| EP | 0 877 130 B1 | 11/1998 |
| EP | 0 661 135 B1 | 12/1998 |
| EP | 0 903 451 A2 | 3/1999 |
| EP | 0 903 451 A3 | 8/1999 |
| EP | 0 958 441 | 11/1999 |
| EP | 0 969 163 A2 | 1/2000 |
| EP | 0 969 163 A3 | 1/2000 |
| EP | 0 969 164 A2 | 1/2000 |
| EP | 0 969 164 A3 | 1/2000 |

(56) References Cited

FOREIGN PATENT DOCUMENTS

| | | |
|---|---|---|
| EP | 0 974 713 A1 | 1/2000 |
| EP | 0 976 889 | 2/2000 |
| EP | 1 045 083 A1 | 10/2000 |
| EP | 1 048 423 A2 | 11/2000 |
| EP | 1 120 515 A1 | 8/2001 |
| EP | 1 146 182 A2 | 10/2001 |
| EP | 1 165 906 | 1/2002 |
| EP | 1 215 352 | 6/2002 |
| EP | 1 223 265 | 7/2002 |
| EP | 1 228 812 A1 | 8/2002 |
| EP | 1 045 083 B1 | 10/2002 |
| EP | 1 251 219 A1 | 10/2002 |
| EP | 1 262 609 | 12/2002 |
| FI | 843060 | 8/1984 |
| FR | 1 293 043 | 4/1962 |
| FR | 2 568 295 | 1/1986 |
| FR | 2 630 149 | 10/1989 |
| FR | 2 637 932 A1 | 4/1990 |
| FR | 2 675 174 | 10/1992 |
| FR | 2 691 491 | 11/1993 |
| FR | 2 697 275 | 4/1994 |
| FR | 2 712 329 A1 | 5/1995 |
| FR | 2 781 513 A1 | 1/2000 |
| FR | 2 785 633 A1 | 5/2000 |
| FR | 2 810 060 A1 | 12/2001 |
| GB | 240 629 | 10/1925 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1127915 | 9/1968 |
| GB | 1 171 337 | 11/1969 |
| GB | 1 237 744 | 6/1971 |
| GB | 1275511 | 5/1972 |
| GB | 1 394 621 | 5/1975 |
| GB | 1 430 423 | 3/1976 |
| GB | 2 117 813 A | 10/1983 |
| GB | 2126106 A | 3/1984 |
| GB | 2 243 381 A | 10/1991 |
| GB | 2 256 023 A | 11/1992 |
| JP | 48-071434 A | 9/1973 |
| JP | 49-031028 B | 8/1974 |
| JP | 50-151232 A | 12/1975 |
| JP | 54-65528 | 5/1979 |
| JP | 55-099774 U | 7/1980 |
| JP | 57-119056 | 7/1982 |
| JP | 57-162668 A | 10/1982 |
| JP | 57-185110 | 11/1982 |
| JP | 59-185346 U | 12/1984 |
| JP | 59-186336 | 12/1984 |
| JP | 1-178659 A | 7/1989 |
| JP | 1-33702 Y2 | 10/1989 |
| JP | 3-169967 | 7/1991 |
| JP | 4-106264 | 4/1992 |
| JP | 4-191001 | 7/1992 |
| JP | 5-148984 | 6/1993 |
| JP | 5-96282 U | 12/1993 |
| JP | 6-39840 B2 | 5/1994 |
| JP | 6-146553 A | 5/1994 |
| JP | 6-56310 | 8/1994 |
| JP | 06-280376 A | 10/1994 |
| JP | 6-320510 A | 11/1994 |
| JP | 7-076923 A | 3/1995 |
| JP | 7-26467 U | 5/1995 |
| JP | 7-180333 A | 7/1995 |
| JP | 7-300979 A | 11/1995 |
| JP | 7-310426 A | 11/1995 |
| JP | 8-033861 A | 2/1996 |
| JP | 8-086080 A | 4/1996 |
| JP | 8-109734 A | 4/1996 |
| JP | 9-38906 A | 2/1997 |
| JP | 9-53319 A | 2/1997 |
| JP | 9-088315 A | 3/1997 |
| JP | 11-131771 A | 5/1999 |
| JP | 2000-079602 A | 3/2000 |
| JP | 2000 179137 | 6/2000 |
| JP | 2000-226932 A | 8/2000 |
| JP | 2001-173213 | 6/2001 |
| JP | 2001-179710 | 7/2001 |
| JP | 2001-254503 | 9/2001 |
| JP | 2001-260107 | 9/2001 |
| JP | 2001-329681 A | 11/2001 |
| JP | 2002 276139 A | 9/2002 |
| JP | 2002-371635 A | 12/2002 |
| JP | 2003-200405 A | 7/2003 |
| NL | 7601773 | 8/1976 |
| NO | 157871 | 7/1984 |
| NO | 305614 | 5/1995 |
| PL | 24931 U | 11/1974 |
| SE | 372 051 | 12/1974 |
| SE | 450 141 | 6/1987 |
| SE | 501 014 C2 | 10/1994 |
| SE | 502 994 | 3/1996 |
| SE | 506 254 C2 | 11/1997 |
| SE | 509 059 | 6/1998 |
| SE | 509 060 | 6/1998 |
| SE | 512 290 | 12/1999 |
| SE | 512 313 | 12/1999 |
| SE | 0000200-6 | 7/2001 |
| SU | 363795 | 11/1973 |
| SU | 1680359 A1 | 9/1991 |
| WO | WO 84/02155 | 6/1984 |
| WO | WO 87/03839 A1 | 7/1987 |
| WO | WO 92/17657 | 10/1992 |
| WO | WO 93/13280 | 7/1993 |
| WO | WO 94/01628 | 1/1994 |
| WO | WO 94/26999 | 11/1994 |
| WO | WO 96/27719 | 9/1996 |
| WO | WO 96/27721 | 9/1996 |
| WO | WO 96/30177 A1 | 10/1996 |
| WO | WO 97/19232 | 5/1997 |
| WO | WO 97/47834 | 12/1997 |
| WO | WO 98/22677 A1 | 5/1998 |
| WO | WO 98/24994 | 6/1998 |
| WO | WO 98/24995 | 6/1998 |
| WO | WO 98/38401 A1 | 9/1998 |
| WO | WO 99/40273 A1 | 8/1999 |
| WO | WO 99/58254 A1 | 11/1999 |
| WO | WO 99/66151 | 12/1999 |
| WO | WO 99/66152 | 12/1999 |
| WO | WO 00/06854 | 2/2000 |
| WO | WO 00/20705 A1 | 4/2000 |
| WO | WO 00/20706 A1 | 4/2000 |
| WO | WO 00/22225 A1 | 4/2000 |
| WO | WO 00/66856 A1 | 11/2000 |
| WO | WO 01/02103 A2 | 1/2001 |
| WO | WO 01/02669 A1 | 1/2001 |
| WO | WO 01/07729 A1 | 2/2001 |
| WO | WO 01/48331 A1 | 7/2001 |
| WO | WO 01/51733 A1 | 7/2001 |
| WO | WO 01/53628 A1 | 7/2001 |
| WO | WO 01/66876 A1 | 9/2001 |
| WO | WO 01/66877 A1 | 9/2001 |
| WO | WO 01/75247 A1 | 10/2001 |
| WO | WO 01/77461 A1 | 10/2001 |
| WO | WO 01/96688 | 12/2001 |
| WO | WO 01/98603 | 12/2001 |
| WO | WO 01/98604 A1 | 12/2001 |
| WO | WO 02/055809 A1 | 7/2002 |
| WO | WO 02/055810 A1 | 7/2002 |
| WO | WO 02/060691 | 8/2002 |
| WO | WO 03/012224 A1 | 2/2003 |
| WO | WO 03/016654 A1 | 2/2003 |
| WO | WO 03/025307 A1 | 3/2003 |
| WO | WO 03/035352 A1 | 5/2003 |
| WO | WO 03/070384 A1 | 8/2003 |
| WO | WO 03/074814 A1 | 9/2003 |

(56) References Cited

FOREIGN PATENT DOCUMENTS

| WO | WO 03/078761 | | 9/2003 |
|----|--------------|---|--------|
| WO | WO 03/083234 | A1 | 10/2003 |
| WO | WO 2005/068747 | A1 | 7/2005 |

OTHER PUBLICATIONS

Pervan, Darko, et al., U.S. Appl. No. 13/667,770, entitled "Appliance and Method for Surface Treatment of a Board Shaped Material and Floorboard," filed in the U.S. Patent and Trademark Office on Nov. 2, 2012.
U.S. Appl. No. 13/046,011, Bergelin, et al.
Bergelin, Marcus, et al., U.S. Appl. No. 13/046,011, entitled "Resilient Groove," filed in the U.S. Patent and Trademark Office on Mar. 11, 2011.
Webster's Dictionary, Random House: New York (1987), p. 862.
Knight's American Mechanical Dictionary, Hurd and Houghton: New York (1876), p. 2051.
Opposition EP 0.698,162 B1—Facts-Grounds-Arguments, dated Apr. 1, 1999, pp. 1-56.
Opposition II EP 0.698,162 B1—Facts-Grounds-Arguments, dated Apr. 30, 1999, (17 pages)—with translation (11 pages).
Opposition I: Unilin Decor N.V./Välinge Aluminum AB, communication dated Jun. 8, 1999 to European Patent Office, pp. 1-2.
Opposition I: Unilin Decor N.V./Välinge Aluminum AB, communication dated Jun. 16, 1999 to European Patent Office, pp. 1-2.
FI Office Action dated Mar. 19, 1998.
NO Office Action dated Dec. 22, 1997.
NO Office Action dated Sep. 21, 1998.
Opposition EP 0.877.130 B1—Facts—Arguments, dated Jun. 28, 2000, pp. 1-13.
RU Application Examiner Letter dated Sep. 26, 1997.
NZ Application Examiner Letter dated Oct. 21, 1999.
European prosecution file history to grant, European Patent No. 94915725.9-2303/0698162, grant date Sep. 16, 1998.
European prosecution file history to grant, European Patent No. 98106535.2-2303/0855482, grant date Dec. 1, 1999.
European prosecution file history to grant, European Patent No. 98201555.4-2303/0877130, grant date Jan. 26, 2000.
Communication of Notices of Intervention by E.F.P. Floor Products dated Mar. 17, 2000, in European Patent Application 0698162, pp. 1-11 with annex pp. 1-21.
Response to the E.F.P. Floor Products intervention dated Jun. 28, 2000, pp. 1-5.
Letters from the Opponent dated Jul. 26, 2001 and Jul. 30, 2001 including Annexes 1 to 3.
Communication from European Patent Office dated Sep. 20, 2001 in European Patent No. 0698162, pp. 1-2 with Facts and Submissions Annex pp. 1-18, Minutes Annex pp. 1-11, and Annex I to VI.
Communication from Swedish Patent Office dated Sep. 21, 2001, in Swedish Patent No. 9801986-2, pp. 1-3 in Swedish with forwarding letter dated Sep. 24, 2001, in English.
Välinge, Fibo-Trespo Brochure, Distributed at the Domotex Fair in Hanover, Germany, Jan. 1996.
Träindustrins Handbook "Snickeriarbete", 2nd Edition, Malmö 1952, pp. 826, 827, 854, and 855, published by Teknografiska Aktiebolaget, Sweden.
"Träbearbetning", Anders Grönlund, 1986, ISBN 91-970513-2-2, pp. 357-360, published by Institutet for Trateknisk Forskning, Stockholm, Sweden.
Drawing Figures 25/6107 from Buetec GmbH dated Dec. 16, 1985. Correspondence from Bütec cited during opposition procedure at EPO in DE Patent No. 3343601, including announcement of Oct. 1984 re "Das Festprogram von Bütec: Mehrzweckbühnen, tanzplatten, Schonbeläge, Tanzbeläge, Bestuhlung"; letter of Nov. 7, 2001 to Perstorp Support AB with attached brochure published Oct. 1984 and installation instructions published Nov. 1984; and letter of Nov. 19, 2001 to Perstorp Support AB.
Pamphlet from Serexhe for Compact-Praxis, entitled "Selbst Teppichböden, PVC und Parkett verlegen", Published by Compact Verlag, München, Germany 1985, pp. 84-87.
Pamphlet from Junckers Industrser A/S entitled "Bøjlesystemet til Junckers boligulve" Oct. 1994, Published by Junckers Industrser A/S, Denmark.
Pamphlet from Junckers Industrser A/S entitled "The Clip System for Junckers Sports Floors", Annex 7, 1994, Published by Junckers Industrser A/S, Denmark.
Pamphlet from Junckers Industrser A/S entitled "The Clip System for Junckers Domestic Floors", Annex 8, 1994, Published by Junckers Industrser A/S, Denmark.
"Revolution bei der Laminatboden-Verl", boden wand decke, vol. No. 11 of 14, Jan. 10, 1997, p. 166.
Pervan, Darko, U.S. Appl. No. 13/853,722, entitled "Building Panel with Compressed Edges and Method of Making Same," filed in the U.S. Patent and Trademark Office on Mar. 29, 2013.
U.S. Appl. No. 14/059,523, Wallin.
Wallin, Magnus, U.S. Appl. No. 14/059,523 entitled "Methods and Arrangements Relating to Surface Forming of Building Panels," filed in the U.S. Patent and Trademark Office on Oct. 22, 2013.
International Search Report issued in PCT/SE03/00471, Jun. 24, 2003, Swedish Patent Office, Stockholm, SE, 5 pages.

\* cited by examiner

*PRIOR ART*

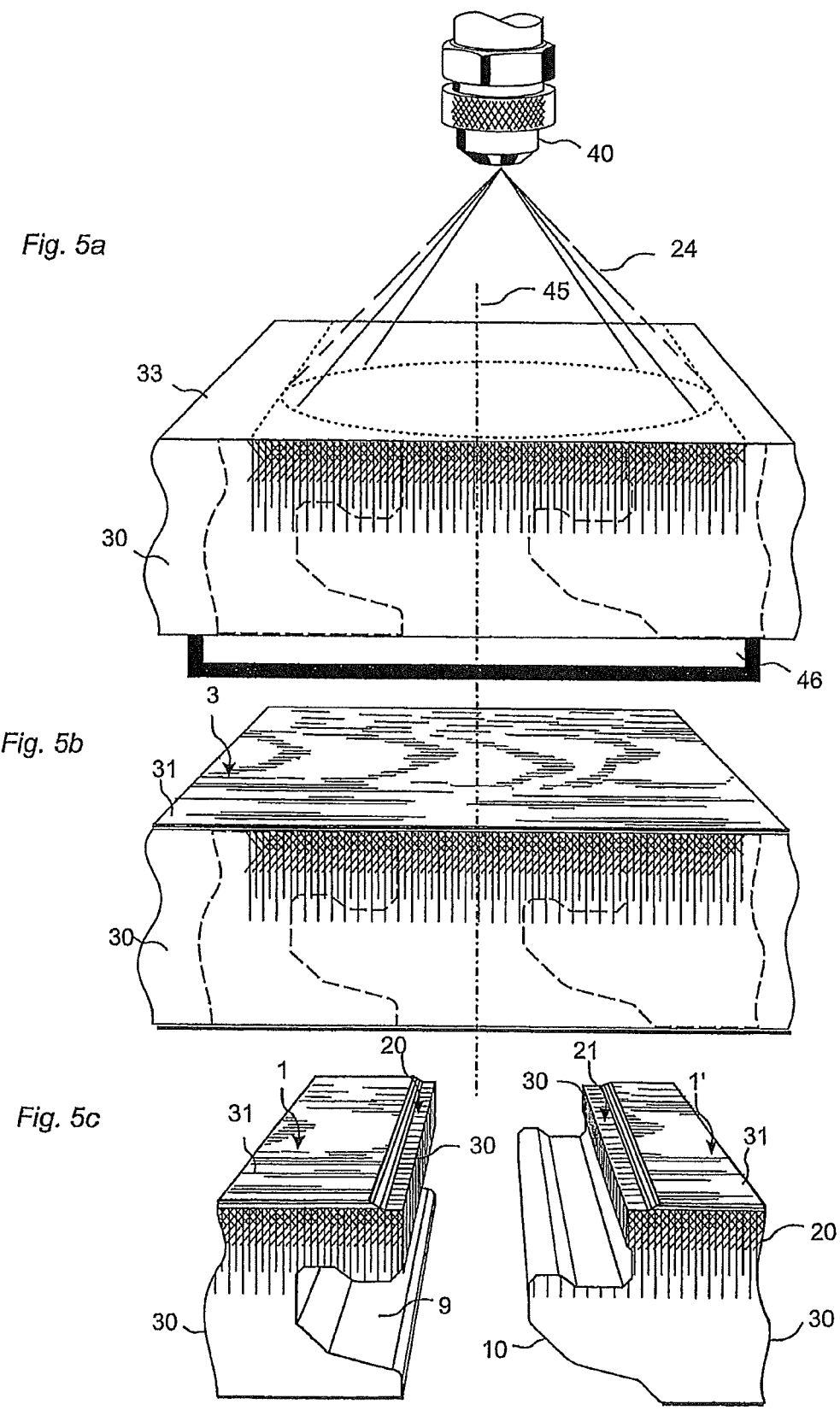

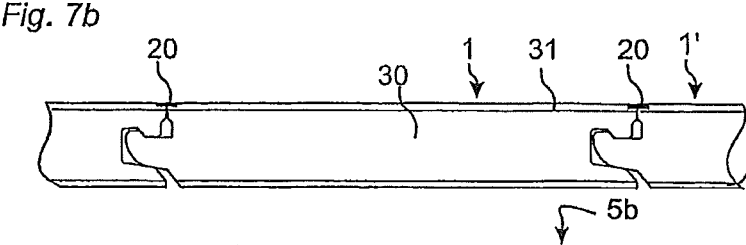
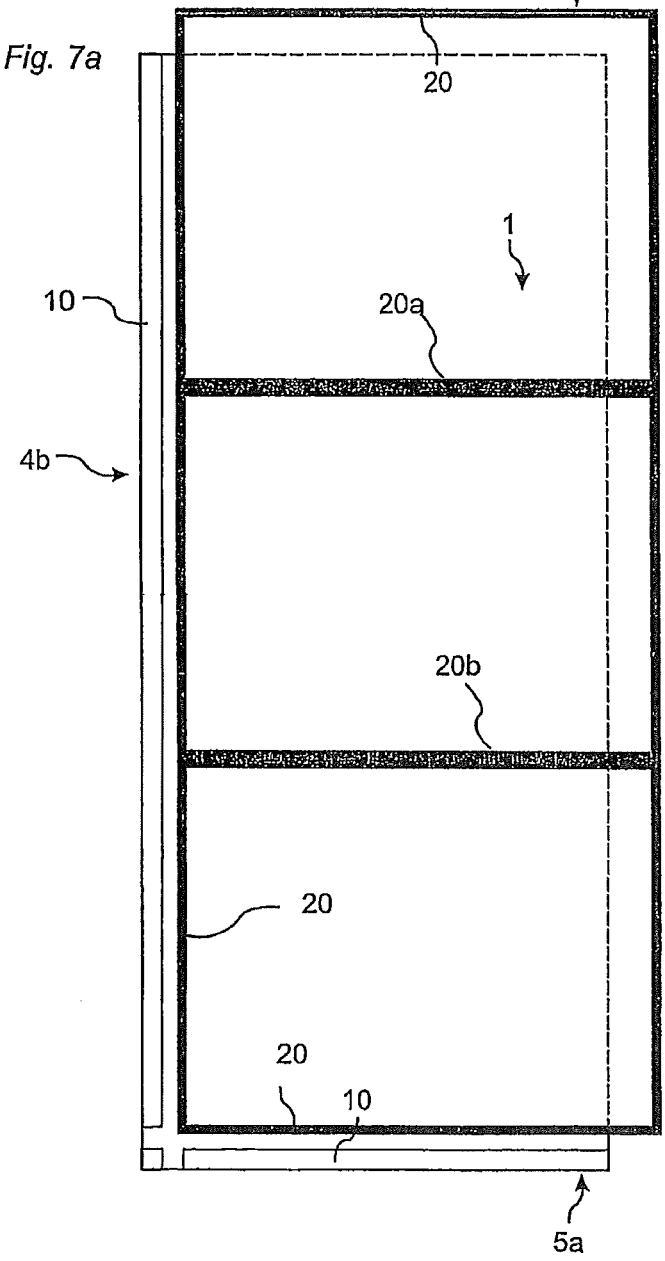
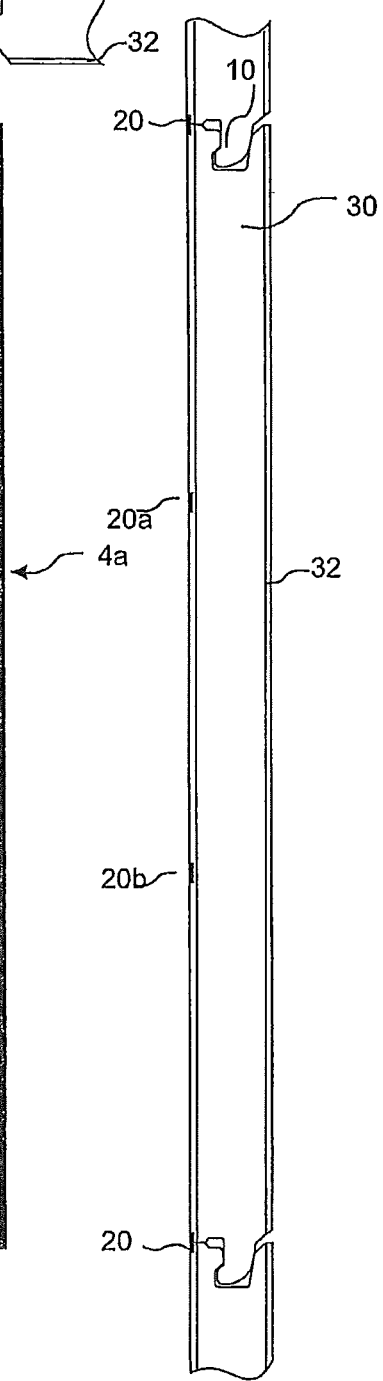

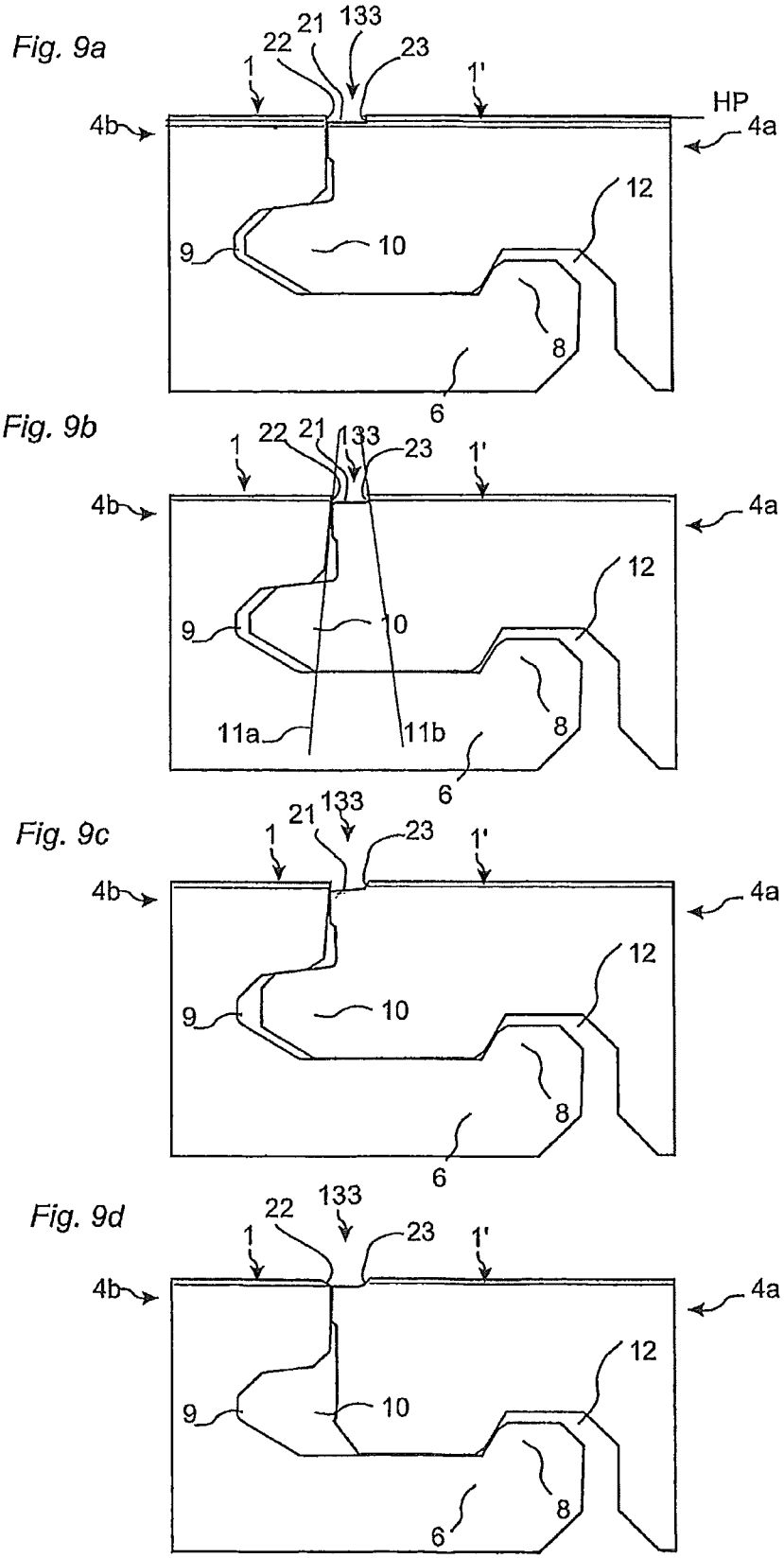

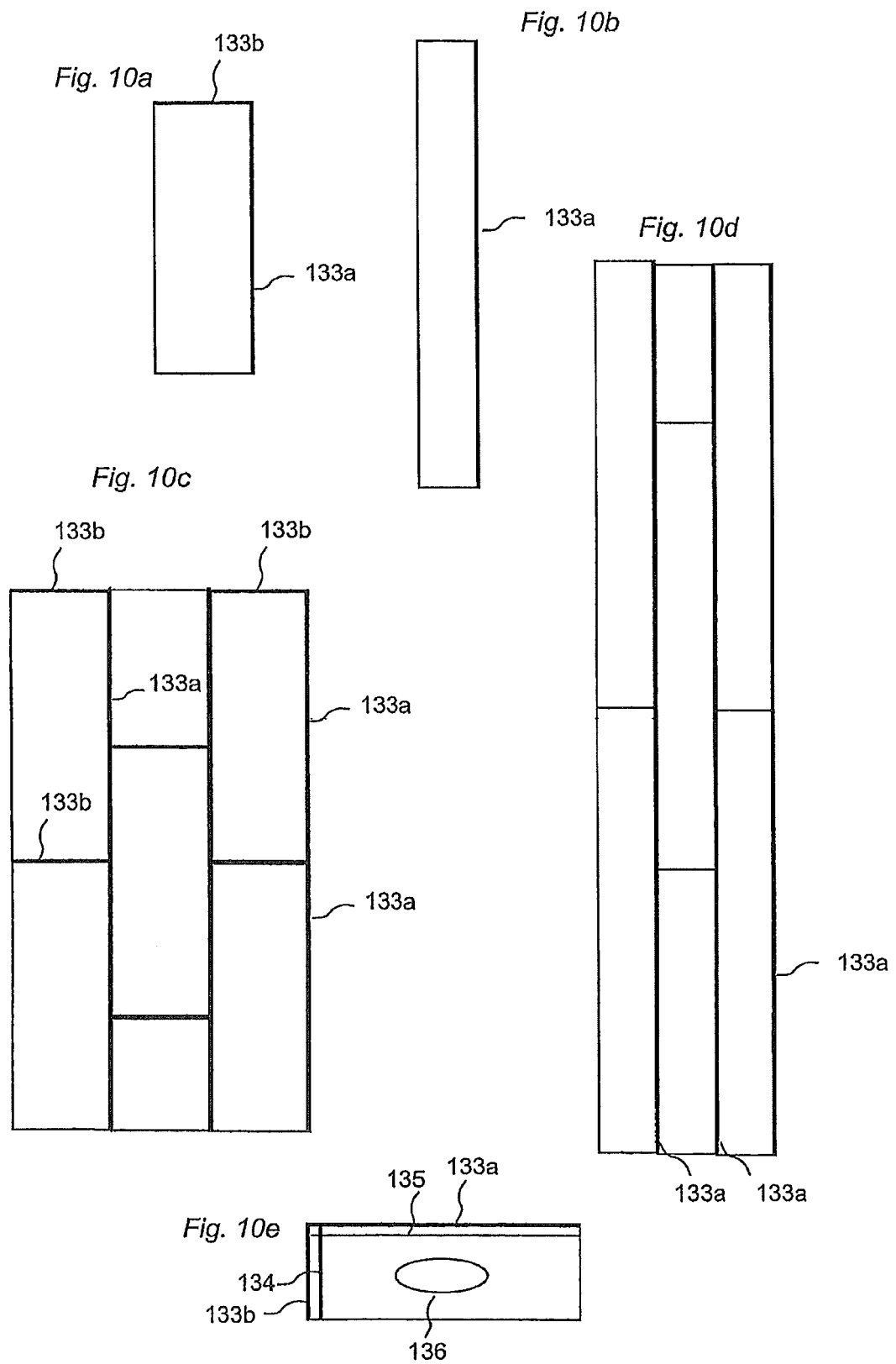

METHOD FOR MAKING FLOORBOARDS WITH DECORATIVE GROOVES

CROSS REFERENCE TO RELATED APPLICATIONS

The present application is a continuation of U.S. application Ser. No. 10/508,198, filed on Jun. 29, 2005, which is a National Stage Application of PCT Application No. PCT/SE03/00471, filed on Mar. 20, 2003, which claims the benefit of PCT Application No. PCT/SE02/01731, filed on Sep. 20, 2002, and the benefit of Swedish Application No. 0200848, filed on Mar. 20, 2002. The entire contents of each of U.S. application Ser. No. 10/508,198, PCT Application No. PCT/SE03/00471, PCT Application No. PCT/SE02/01731 and Swedish Application No. 0200848 are hereby incorporated herein by reference.

TECHNICAL FIELD

The invention generally relates to the field of decorative grooves for floorboards. The invention relates to floorboards provided with such decorative grooves and methods for making such floorboards. The invention is particularly suited for use in mechanical locking systems integrated with the floorboard of the type described and shown, for example, in WO9426999, WO9966151, WO9966152, SE 0100100-7 and SE0100101-5 (owned by Välinge Aluminium AB) but is also usable in optional joint systems which can be used to join floors.

More specifically, the invention relates above all to floors of the type having a core and a decorative surface layer on the upper side of the core.

FIELD OF APPLICATION OF THE INVENTION

The present invention is particularly suitable for use in floating floors, which are formed of floorboards which are joined mechanically with a joint system integrated with the floorboard, i.e. mounted at the factory, and are made up of one or more preferably moisture-proof upper layers of decorative laminate or decorative plastic material, an intermediate core of wood-fibre-based material or plastic material and preferably a lower balancing layer on the rear side of the core. The following description of prior-art technique, problems of known systems and objects and features of the invention will therefore, as a non-restrictive example, be aimed above all at this field of application and in particular laminate flooring formed as rectangular floorboards intended to be mechanically joined on both long sides and short sides. However, it should be emphasised that the invention can be used in optional floorboards with optional joint systems, where the floorboards preferably have a core and at least one surface layer and where these two parts have, or in connection with manufacture can obtain, different decorative properties in the form of colour, pattern, structure or the like. The invention can thus also be applicable to, for instance, floors with one or more surface layers of wood, plastic material, flexible fibres such as needle felt or combinations of different materials, for instance wood, plastic, cork, rubber or other materials that are used as surface layers in floors. The invention can also be used to form decorative joint portions in homogeneous materials such as homogeneous wooden floors.

BACKGROUND OF THE INVENTION

Laminate flooring usually consists of a core of a 6-9 mm fibreboard, a 0.2-0.8 mm thick upper decorative surface layer of laminate and a 0.1-0.6 mm thick lower balancing layer of laminate, plastic, paper or like material. The surface layer provides appearance and durability to the floorboards. The core provides stability, and the balancing layer keeps the board plane when the relative humidity (RH) varies during the year. Laminate flooring can also be made of compact laminate. Surface layer and balancing layer are then applied to a core of phenol-impregnated kraft paper or phenol-impregnated wood fibres. Manufacture of surface layer, core and balancing layer takes place while pressure and heat are being supplied. The floorboards are usually laid floating, i.e. without gluing, on an existing subfloor which does not have to be completely smooth or plane. Any irregularities are eliminated wholly or partly by means of base material in the form of e.g. board or foam which is placed between the floorboards and the subfloor. Traditional hard floorboards in floating flooring of this type are usually joined by means of glued tongue-and-groove joints (i.e. joints involving a tongue on one floorboard and a tongue groove on an adjoining floorboard) on long side and short side. When laying the floor, the boards are brought together horizontally, whereby a projecting tongue along the joint edge of one board is introduced into a tongue groove along the joint edge of an adjoining board. The same method is used on the long side as well as on the short side.

In addition to such traditional floors, which are joined by means of glued tongue-and-groove joints, floorboards have recently been developed which do not require the use of glue and instead are joined mechanically by means of so-called mechanical joint systems. These systems comprise locking means which lock the boards horizontally and/or vertically. The mechanical joint systems can be formed by machining of the core of the board. Alternatively, parts of the locking system can be formed of a separate material, which is integrated with the floorboard, i.e. joined with the floorboard even in connection with the manufacture thereof. Separate materials can either be fixedly secured to the floorboard mechanically, by means of glue and the like. They can also be mechanically secured in such a manner that they can, for instance, be displaced along the joint edge or be detached by an angular motion.

The main advantages of floating floors with mechanical joint systems are that they can easily and quickly by laid by various combinations of inward angling, snapping-in and displacement along the joint edge. Snapping-in can take place by displacement of the joint edges horizontally, vertically or at different angles. The floorboards can also easily be taken up again and used once more at a different location. A further advantage of the mechanical joint systems is that the edge portions of the floorboards can be made of materials which need not have good gluing properties.

The most common core material is a fibreboard with high density and good stability usually called HDF—High Density Fibreboard. Sometimes also MDF—Medium Density Fibreboard—is used as core. As a rule, these core materials are of high quality and often have an attractive surface which can resist penetration of moisture.

Thick surface layers of wood, for instance 1-4 mm, are usually applied to a core consisting of wood blocks whose fibre direction is perpendicular to the fibre direction of the surface layer. Particle board, fibreboard or plywood are also used both when the surface layer is thick and also when the surface layers are thin veneer with a thickness of e.g. 0.2-1.0 mm.

Laminate flooring and also many other floorings with a surface layer of plastic, wood, veneer, cork and the like are made by the surface layer and the balancing layer being applied to a core material. This application may take place by gluing a previously manufactured decorative layer, for instance when the fibreboard is provided with a decorative high pressure laminate which is made in a separate operation where a plurality of impregnated sheets of paper are compressed under high pressure and at a high temperature. The currently most common method when making laminate flooring, however, is direct laminating which is based on a more modern principle where both manufacture of the decorative laminate layer and the fastening to the fibreboard take place in one and the same manufacturing step. Impregnated sheets of paper are applied directly to the board and pressed together under pressure and heat without any gluing.

In addition to these two methods, a number of other methods are used to provide the core with a surface layer. A decorative pattern can be printed on the surface of the core, which is then, for example, coated with a wear layer. The core can also be provided with a surface layer of wood, veneer, decorative paper or plastic sheeting, and these materials can then be coated with a wear layer.

As a rule, the above methods result in a floor element in the form of a large board which is then sawn into, for instance, some ten floor panels, which are then machined to floorboards. The above methods can in some cases result in completed floor panels and sawing is then not necessary before the machining to completed floorboards is carried out. Manufacture of individual floor panels usually takes place when the panels have a surface layer of wood or veneer.

In all cases, the above floor panels are individually machined along their edges to floorboards. The machining of the edges is carried out in advanced milling machines where the floor panel is exactly positioned between one or more chains and bands mounted, so that the floor panel can be moved at high speed and with great accuracy past a number of milling motors, which are provided with diamond cutting tools or metal cutting tools, which machine the edge of the floor panel. By using several milling motors operating at different angles, advanced joint geometries can be formed at speeds exceeding 100 m/min and with an accuracy of ±0.02 mm.

DEFINITION OF SOME TERMS

In the following text, the visible surface of the installed floorboard is called "front side", while the opposite side of the floorboard, facing the subfloor, is called "rear side". The sheet-shaped starting material that is used is called "core". When the core is coated with a surface layer closest to the front side and preferably also a balancing layer closest to the rear side, it forms a semi-manufacture which is called "floor panel" or "floor element" in the case where the semi-manufacture, in a subsequent operation, is divided into a plurality of floor panels mentioned above. When the floor panels are machined along their edges so as to obtain their final shape with the joint system, they are called "floorboards". By "surface layer" are meant all layers applied to the core closest to the front side and covering preferably the entire front side of the floorboard. By "decorative surface layer" is meant a layer which is mainly intended to give the floor its decorative appearance. "Wear layer" relates to a layer which is mainly adapted to improve the durability of the front side. In a laminate floor, this wear layer often consists of a transparent paper containing melamine and aluminium oxide. By "reinforcing layer" is meant a layer which is mainly intended to improve the capability of the surface layer of resisting impact and pressure and, in some cases, compensating for the irregularities of the core so that these will not be visible at the surface. In high pressure laminates, this reinforcing layer usually consists of brown kraft paper which is impregnated with phenol resin. By "decorative layer" is meant a layer which is applied to the reinforcing layer in an analog manner, i.e. under the decorative surface layer, but with a view to achieving a predetermined appearance, rather than a reinforcing effect. The decorative layer can be identical with the reinforcing layer by this being stained or modified in some other manner to obtain a desired appearance.

By "the part of the core which is closest to the surface layer" is generally meant the part of the core which is positioned above the vertical locking means, and preferably at a shorter distance from the surface layer of the core than from the vertical locking means.

Regarding "plywood", which consists of several layers of crosswise joined layers of wood, the inner layers of the plywood are to be considered to constitute a core, the outer layers being considered to constitute surface layer, reinforcing layer and/or decorative layer, according to the definitions above.

By "horizontal plane" is meant a plane which is parallel to the outer part of the surface layer. In the joined position, the two juxtaposed upper joint edges define a "vertical joint plane".

The outer parts of the floorboard at the edge of the floorboard between the front side and the rear side are called "joint edge". As a rule, the joint edge has several "joint surfaces" which can be vertical, horizontal, angled, rounded, bevelled etc. These joint surfaces can be made of different materials, for instance laminate, fibreboard, wood, plastic, metal (e.g. aluminium) or sealing material. By "joint edge portion" are meant the joint edge of the floorboard and part of the floorboard portions closest to the joint edge. By "decorative joint portion" is generally meant part of the surface of the floorboard which is intended to resemble a visible joint between, for instance, stone or wood material.

By "joint" or "joint system" are meant coacting connecting means which connect the floorboards vertically and/or horizontally. In connection with joining of the floorboards, "vertical" means a direction which is perpendicular to the horizontal plane. "Horizontal" means a direction which is perpendicular to the vertical joint plane of the respective joints.

The above techniques can be used to manufacture laminate floorings which are highly natural copies of wooden flooring. In recent years, imitations of stones, tiles and the like have become more and more common. In this context, it is tried to manufacture decorative joint portions between stones and tiles which should be as natural as possible. They should have decoration and structure other than those of the stone material and should also be somewhat lowered under the horizontal plane to resemble an embedded joint between two stones or tiles. The techniques used to manufacture these decorative joint portions are expensive and do not provide a natural appearance. It should be possible to increase the market for these types of flooring significantly if decorative joint edge portions could be made in a simpler and less expensive manner and with a more natural appearance.

Prior-Art Technique and Problems Thereof

When making laminate flooring with decorative and embedded joint portions, the starting material is a decorative paper with printed joint edge portions. This paper is usually impregnated with melamine resin. Uncontrolled swelling takes place in this operation. In the subsequent lamination, the decorative impregnated paper is placed on a core. A transparent wear layer is preferably placed over this decorative paper and then lamination takes place against an embossed metal sheet, in which joint portions are formed which usually have a structure different from that of the remaining part of the metal sheet and where joint portions are designed so that a depression of 0.2 mm can be provided in connection with laminating. The result is a floor element whose front side has an embedded joint pattern corresponding to the intended joint portions between, for instance, tiles or stones.

This manufacturing method suffers from a number of problems which are above all related to difficulties in positioning the decorative paper and metal sheets in connection with laminating and the difficulty in positioning floor element and floor panels in the subsequent sawing and machining of the joint edges.

The metal sheet must be positioned with great accuracy relative to the decorative paper. Even if this is carried out with extremely great accuracy, it is not possible to eliminate the uncontrolled swelling in connection with impregnating. This swelling also causes problems in the sawing operation and machining of joint edges. The result of these swelling and positioning problems is that decoration and embossing do not agree with each other and that the decorative embedded joint portions vary between different floorboards, which results in an unnatural appearance.

To counteract these problems, different methods have been used. One method is to limit the format of the floor element so as to thus reduce the maximum deviation in connection with swelling. Special marks are made on the decorative paper which can then be read optically in connection with pressing and sawing. Then the boards are aligned as accurately as possible and individual adjustment of the sawblades can be made for each floor element.

The main disadvantage of this method is high cost, low capacity and extremely great remaining deviation between decoration, embossing and joint edge in the completed floorboard.

It is also difficult to provide a deep depression in high pressure laminate without damaging the decorative paper. Depressing of joint portions in connection with direct lamination results in fibres of the core being compressed. The compressed fibres can later, if moisture penetrates, swell more than normal and cause damage to the joint edge.

It is known that laminate floor or wooden floor can have an upper joint edge which is rounded or bevelled at an angle of 35-45 degrees. This type of edge machining which is mainly intended to reduce the problems with different vertical positions between two joint edges is not suitable to provide the design of the edge which the present invention can provide.

BRIEF DESCRIPTION OF THE INVENTION AND OBJECTS THEREOF

An object of the present invention is to eliminate or reduce one or more of the problems occurring in connection with manufacture and use of floorboards with decorative embedded joint portions. A further object of the invention is to provide a rational and cost-efficient manufacturing method for manufacturing floor elements, floor panels and floorboards.

The above objects are wholly or partly achieved by systems, floorboards and methods according to the independent claims. Embodiments of the invention are evident from the dependent claims as well as from the description and drawings.

The invention is based on the knowledge that the decorative joint portions should be made in connection with the machining of the joint edges of the floor panel. Laminating and sawing can then take place without any specific requirements as to alignment, and swelling problems do not occur.

The decorative and embedded joint portion can be provided by part of the surface layer, preferably the decorative surface layer, being removed to such an extent that an underlying layer is uncovered, which layer has a desired decorative effect. This underlying layer can be, for instance, a surface layer which is a reinforcing layer, a decorative layer or an uncovered part of the core of the floorboard. According to an embodiment, machining takes place to such a depth that the decorative surface layer is removed and it is ensured that the underlying layer is uncovered. According to an embodiment, the machining of the underlying layer can be limited to what is necessary to achieve the desired effect. Thus, machining can be carried out to such a depth that the surface layer, at the joint edge, is completely removed, but without completely removing the underlying layer. This may in some cases result in the removing of material, for the purpose of completely removing the surface layer, being allowed to extend slightly into the underlying layer.

The decorative joint portion can also be provided by machining which removes all surface layers so that the core becomes visible. Also in this case, the depth of machining can be limited to the parts of the core which are closest to the surface layer.

According to an embodiment, the depth of machining is very small in relation to the thickness of the floorboard. Such shallow grooves give a number of advantages, for instance that decorative grooves can be provided which do not collect dirt and which are easy to clean. Other advantages imply that machining in the surface layers or in the core parts closest to the surface layers need not cause deterioration of the floorboard in terms of durability, impact strength or moisture resistance.

We have discovered that with suitable working machines and diamond cutting tools, it is possible to make a partial removal of the surface layer with an accuracy of 0.01 mm. The surface layer can thus be removed partially and the underlying layer can be uncovered. This underlying layer can be given an appearance and structure that deviate from the remaining surface of the floorboard and can thus constitute an embedded decorative joint portion.

The invention is particularly suited for use in the joint edge portions of the floorboards, but one or more decorative embedded grooves according to the invention can also be arranged at an optional location between the joint edge portions of the floorboards.

Thus the floorboard can have a surface that consists of a plurality of surface portions with decorative embedded grooves between these portions, thereby forming a surface pattern with a plurality of tiles or elongate blocks or the like. The decorative portion can be placed optionally on the surface of the floorboard and it can have an optional extent or shape. The decorative joint portion can be positioned on both adjoining edges of two joined floorboards. The decorative joint portion can also be positioned on one edge only. The joint portion can, but need not, have an extent that covers the entire joint edge. The decorative joint portion can be parallel with the joint edge, but it may also have a deviating shape, for instance wave-shaped, toothed, wedge-shaped and the like. Such shapes can be achieved, for example, by machining using an oscillating tool, or by machining using an angled tool with an embossed surface. Nor does the decorative joint portion need to have the same depth from the floor surface along its entire extent or between two adjoining joint edges.

The invention is also particularly suited for use with floorboards having mechanical joint systems which allow exact positioning of the floorboards relative to each other without visible joint gaps in the decorative joint portion. Such locking systems give the decorative joint portion a natural appearance.

According to a first aspect of the invention, a system is provided for making a decorative joint portion between two adjoining joint edges of floorboards which have a core and a surface layer which is arranged on the upper side of the core as well as connecting means arranged at said adjoining joint edges for connecting the floorboards with each other in the vertical and/or horizontal direction, the parts of the surface layer closest to said adjoining joint edges forming a horizontal plane, and the surface layer comprising an upper layer and an underlying layer. The system is characterised in that at least one of said adjoining joint edges has a surface which consists of the underlying layer and which is essentially parallel to the horizontal plane.

According to this aspect of the invention, the decorative visible reinforcing layer can be made in a number of different ways. The kraft paper which constitutes the reinforcing layer can be wholly or partly stained in the parts that will later constitute the decorative joint portions. The partial staining can take place with overmeasure so as not to cause positioning problems in the rest of the production process. Phenol or melamine resin that is used in impregnation can be stained. Decorative reinforcing layers can be arranged both in manufacture of floorboards with surface layers of high pressure laminate and direct laminate. Surface layers of plastic or several layers of decorative veneer layers can in the same way be machined for the purpose of providing decorative joint portions.

The machining extends preferably to a depth which is at least 0.1 times the thickness of the surface layer, counting from the upper side of the surface layer, provided that this is sufficient to uncover an underlying layer.

The extent of the machining counting from the joint plane and inwards is selected so that a groove of a desired width is formed. When selecting the width of the groove, it is also taken into consideration whether only one or both of two adjoining floorboards are to be provided with decorative grooves, the grooves of each floorboard being given a suitable width.

For instance, the extent of the machining counting from the vertical joint plane and inwards to the floorboard can also be at least 0.1 times the thickness of the floorboard. Such a decorative joint portion is suitable to resemble a joint gap between homogeneous parquet blocks or floorboards of wood. The uncovered reinforcing layer, counting from the vertical joint plane, may also have an extent corresponding to about 0.25 times the thickness of the floorboard. Such a decorative joint portion is suitable to resemble a joint between two stone slabs. The decorative joint portion may also have an optional horizontal extent within the range 0.1-1.0 times the thickness of the floorboard. In normal laminate floors with a thickness of 6-9 mm, such decorative joint portions may suitably be formed with a horizontal extent corresponding to, for instance, 0.5-3.0 mm.

According to a second aspect of the invention, surface layers on the core may be removed so that the core becomes visible. The core can thus be used to create a decorative embedded joint portion, either by the core having suitable properties, or by part of or the entire core before laminating, or after machining, being machined in a convenient manner so as to provide a decorative appearance or better properties in order to counteract moisture or wear.

We have discovered that mechanical joint systems as a rule require the use of relatively qualified core materials to provide a mechanical joint system with sufficient strength and a good function. Such high quality core materials, however, are not used for decoration purposes since they are concealed by the surface layer.

According to the second aspect of the invention, the decorative joint portion is formed by the surface layer being removed and the core being uncovered within areas that are to constitute the decorative joint portion.

HDF and plastic materials are particularly convenient in this context. HDF boards can, for instance, be stained using different colorants even in manufacture, and portions of the core can be reinforced by impregnating before or after laminating, using chemicals such as melamine, phenol, polyurethane and the like. The uncovered core can, for instance, be impregnated after machining. This impregnation can take place with great accuracy, using chemicals such as various types of oil or wax. These agents can penetrate into the core and they can be drawn in under the laminate surface. By suitable machining, the visible core surface can be machined with very high precision. It is advantageous if machining occurs to a depth which is marginally greater than the surface layer. The advantage is that such decorative joint portions do not collect dirt. If the surface layer is directly laminated, such machining will also cause the surface of the uncovered core to have good properties in terms of moisture and wear. We have discovered that core parts immediately under the surface layer are impregnated with melamine in connection with the laminating process when the melamine-impregnated paper is pressed against the core. The melamine penetrates about 0.2-0.4 mm into the core under the surface layer and bonds the wood fibres. The depth of penetration and the amount of melamine depend on the laminating process. Machining which is essentially parallel with the surface layer and extends to a depth of e.g. 0.1 mm under the surface layer may be advantageous since the uncovered core surface will then contain a great amount of melamine. The quality properties of the decorative joint portion may thus be positively affected by a suitable laminating method being used. A larger amount of melamine in the decorative layer, and a longer press cycle and/or machining of the surface of the core so that it will be more susceptible to melamine, may be used to affect the quality properties of the joint portions. This is also applicable when surface layers of e.g. high-pressure laminate or wood are glued to a core. Glue penetrates into the upper parts of the core and bonds the fibres. Glue, melamine and other chemicals used in the production of floor elements or floor panels may also be stained, which may be used to obtain decorative effects. The visible joint edges can be machined to a number of varying shapes, such as rounded, bevelled at different angles and the like. Grooves can be made in the core before or after laminating, which are filled with suitable filling materials which have more suitable properties than does the core as regards, for instance, moisture and decoration. These filling materials can be placed in the core in the areas which will then constitute visible portions when the surface layer is removed or when the joint edge is given its final shape.

The floor surface may be provided with optional decorative grooves. One or more parallel grooves may exist at the joint edges and/or between the joint edges. The grooves may also be rectangular, square, round, elliptic and the like. With a modern production process, advanced patterns can be made in the floor surface. This technique is particularly suitable for laminate floors, but may also be used in other types of floors.

Additional aspects of the invention comprise floorboards provided with systems according to the above-described aspects, a floor panel intended as semi-manufacture for manufacturing such floorboards, and a method for manufacturing such floorboards.

Examples of embodiments of the invention will now be described in more detail with reference to the accompanying drawings.

BRIEF DESCRIPTION OF THE DRAWINGS

FIGS. 5a-c show an alternative embodiment of the decorative joint portion according the invention.

FIGS. 7a-c show a floorboard according to the invention.

FIGS. 9a-d illustrate different embodiments of the invention,

FIGS. 10a-e illustrate different embodiments of floorboards manufactured according to the invention.

DESCRIPTION OF EMBODIMENTS OF THE INVENTION

Figure 1A:
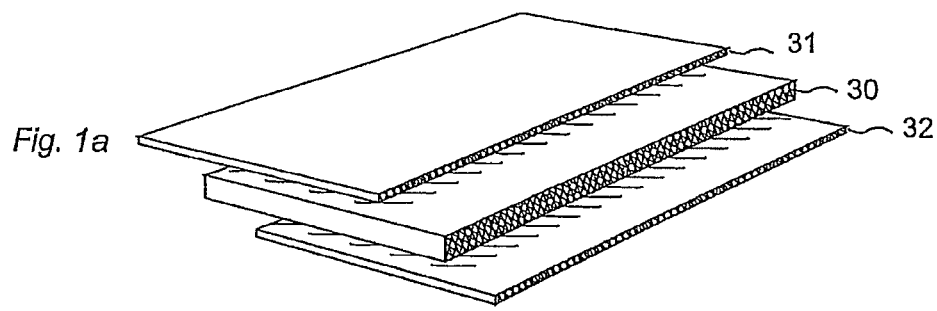
FIGS. 1a-d illustrate in different steps manufacture of a floorboard.
Figure 1B:
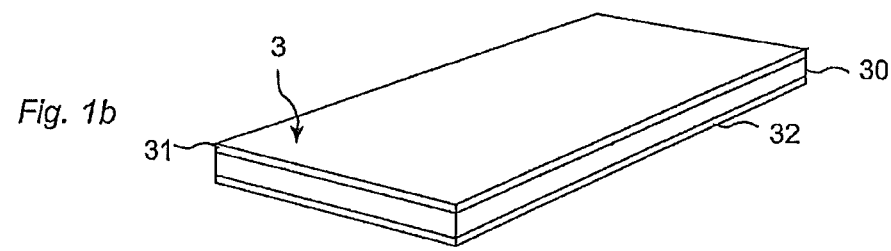
Figure 1C:
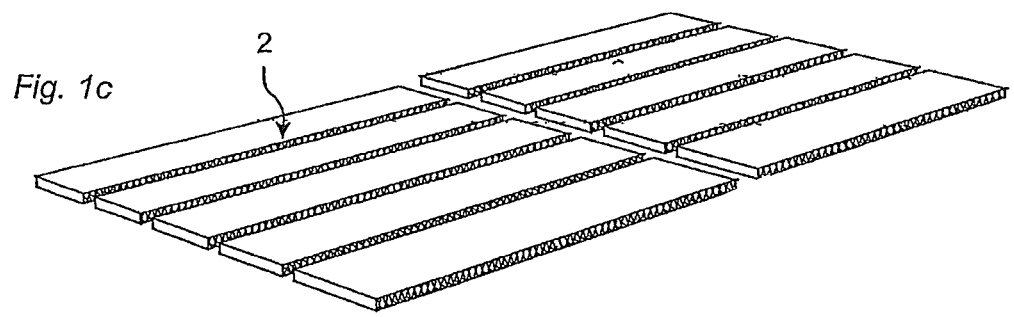
Figure 1D:
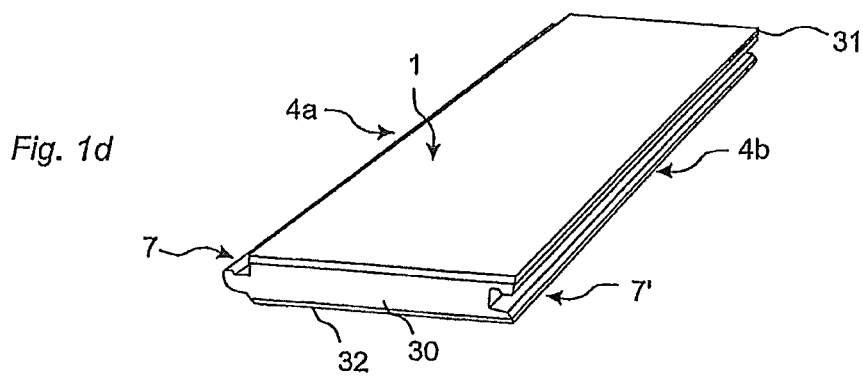

FIGS. 1a-d show in four steps manufacture of a floorboard. FIG. 1a shows the three basic components surface layer 31, core 30 and balancing layer 32. FIG. 1b shows a floor element 3, where surface layer and balancing layer have been applied to the core. FIG. 1c shows how floor panels 2 are made by dividing the floor element. FIG. 1d shows how the floor panel 2 after machining of its edges obtains its final shape and becomes a completed floorboard 1 with a joint system 7, 7', which in this case is mechanical, on the long sides 4a, 4b.

Figure 2A:
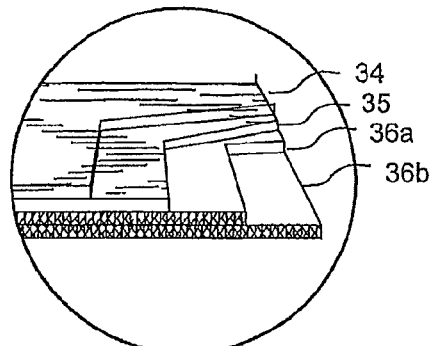
FIGS. 2a-e illustrate the composition of laminate flooring with a surface of high pressure laminate and direct laminate.
Figure 2B:
Figure 2C:
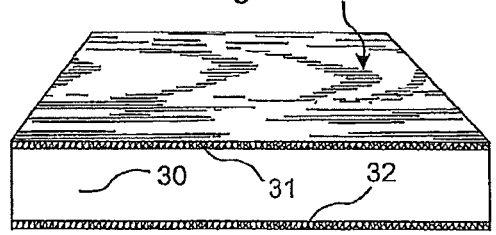

FIG. 2a shows manufacture of high pressure laminate. A wear layer 34 of a transparent material with great wearing strength is impregnated with melamine with aluminium oxide added. A decorative layer 35 of paper impregnated with melamine is placed under this layer 34. One or more reinforcing layers 36a, 36b of core paper impregnated with phenol are placed under the decorative layer 35 and the entire packet is placed in a press where it cures under pressure and heat to an about 0.5-0.8 mm thick surface layer 31 of high pressure laminate. FIG. 2c shows how this surface layer 31 can then be glued together with a balancing layer 32 to a core 30 to constitute a floor element 3.

When making compact laminate, the entire core consists of reinforcing layers.

Figure 2D:
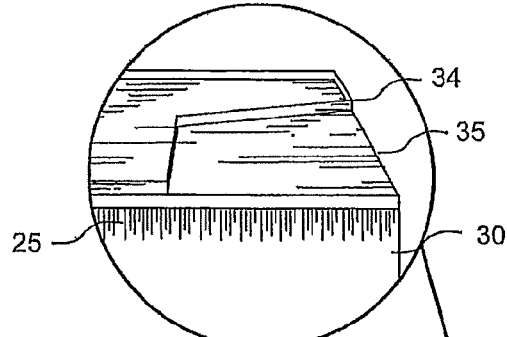
Figure 2E:
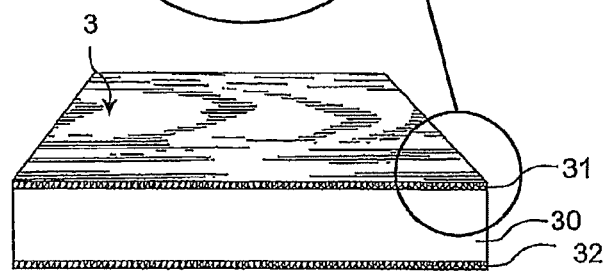

FIGS. 2d and 2e illustrate direct lamination. A wear layer 34 in the form of an overlay and a decorative layer 35 of decoration paper, which are impregnated with melamine, are placed directly on a core 30, after which all three parts and, as a rule, also a rear balancing layer 32 are placed in the press where they cure under heat and pressure to a floor element 3 with a decorative surface layer 31 having a thickness of about 0.2 mm. The upper part 25 of the core closest to the decoration paper 35 will be impregnated with melamine in lamination. As a rule, 0.2 mm of the core closest to the surface layer is impregnated with melamine. This part has better properties than other parts of the core and is less sensitive to moisture, impact and wear. It may thus be an advantage if the decorative joint portion is formed in this part of the core. A glue layer used for joining of surface layer and core may have the same function.

Figure 3A:
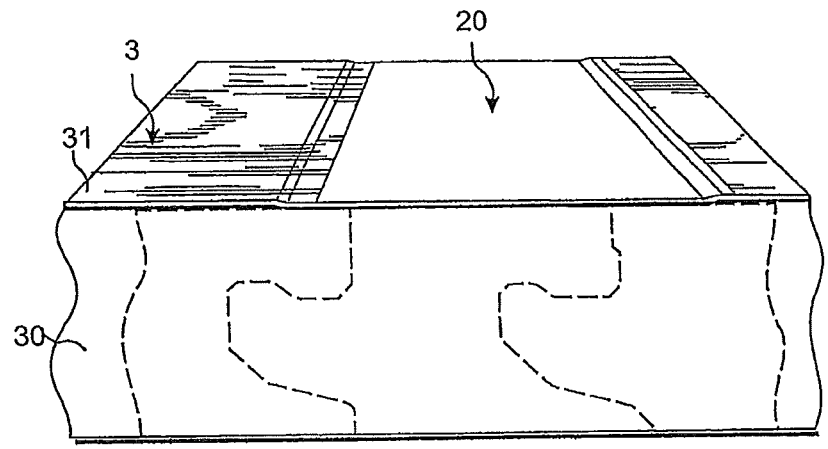
FIGS. 3a-b illustrate examples of different ways of manufacture of a decorative joint portion according to prior art.
Figure 3B:
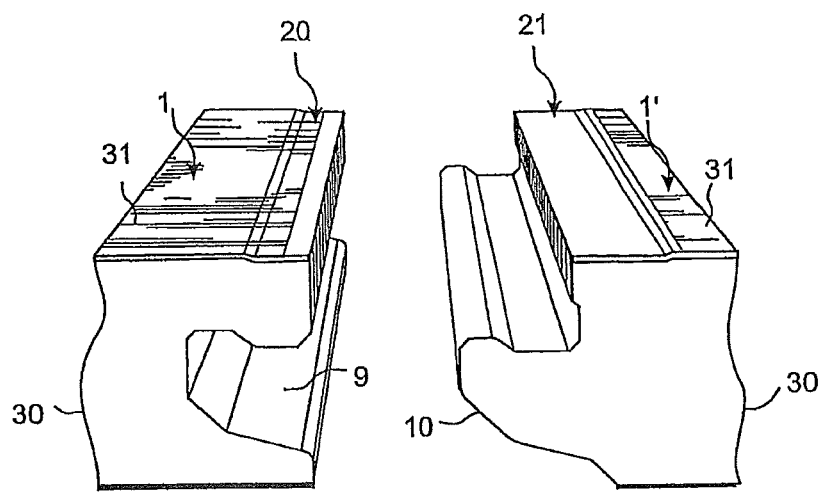

FIGS. 3a-c show manufacture of a decorative joint portion 20, 21 according to prior art. FIG. 3a shows the floor element 3 before sawing. Owing to uncontrolled swelling of the decoration paper, the embossing of the surface has not occurred with sufficient precision. FIG. 3b shows the edges of the floorboard after sawing and machining. Decoration and embossing deviate significantly from the intended position.

Figure 4A:
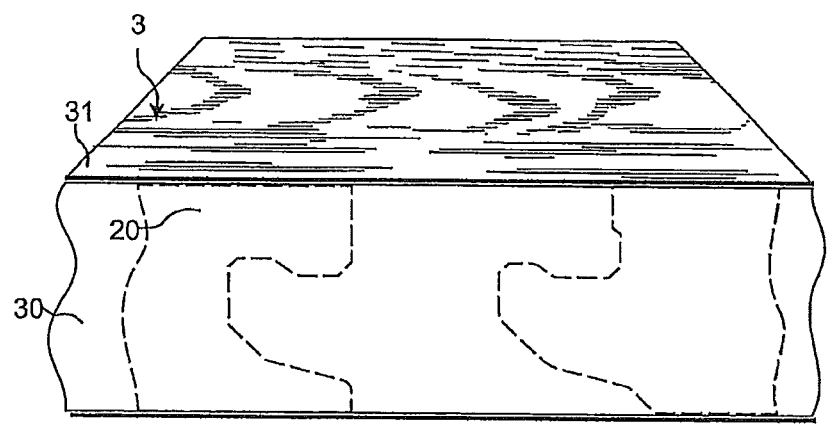
FIGS. 4a-b illustrate a decorative joint portion according to the invention.
Figure 4B:
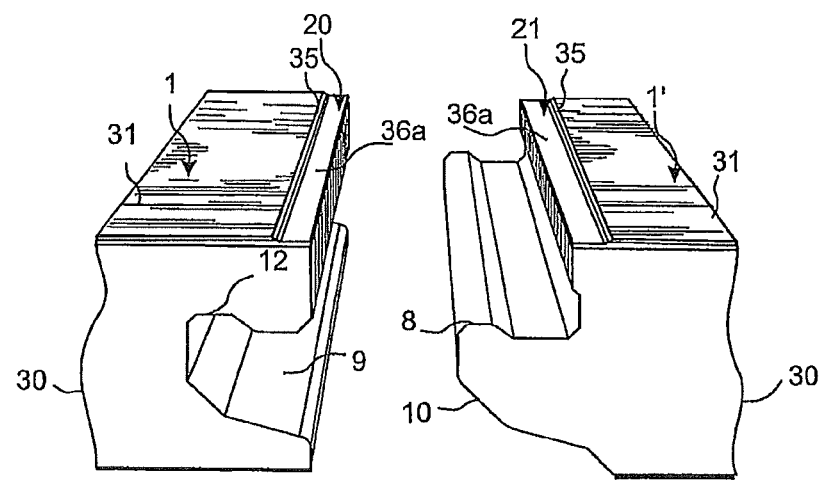

FIGS. 4a-b show manufacture of a decorative joint portion 20, 21 according to the invention. FIG. 4a shows a floor panel after laminating, but before sawing. The decorative joint portion 20, 21 has been made by machining of the joint portions. The decorative surface layer 35 has been removed and the reinforcing layer 36a is visible and constitutes a decorative joint portion 20, 21. The edges of the floorboard are in this embodiment provided with a mechanical locking system consisting of a groove 9 and a tongue 10 which lock vertically and a locking groove 12 and a locking element 8 which lock horizontally. The joint edges may have optional joint systems. The decorative joint portions 20, 21 have in this embodiment essentially the same width and depth. The width and depth may also be different between the two joint portions 20, 21.

FIGS. 5a-c show in detail the different steps of manufacture for providing a decorative joint edge portion which in this embodiment consists of a wood-fibre-based core 30 which is impregnated and/or stained before lamination. According to FIG. 5a, the stained impregnating material 24 is applied, for instance with a nozzle 40, to the core surface 33 in the portions which in the completed floorboard will constitute the decorative joint portions 20, 21. A considerable part of the upper part of the intended joint edge is impregnated, so that a stained and preferably moisture-proof core portion is formed. Vacuum 46 can be used to facilitate penetration of impregnating material.

FIG. 5b shows the floor element 3 with a surface layer 31, a balancing layer 32 and the intended saw cut 45.

FIG. 5c shows the edges of the floor panel 1, 1' after sawing and machining.

The surface layer 35 has been partially removed so that the stained and uncovered core is visible and constitutes a decorative joint portion 20, 21. As an alternative to impregnation before lamination, the joint edge portions in FIG. 5c can be impregnated with, for instance, different hydrophobing substances that are applied after machining. Such substances can be petroleum-based wax, mineral oil and the like, optionally with pigments added. They can, for instance, be applied in several steps with supply of energy to facilitate penetration and hardening.

Figure 6A:
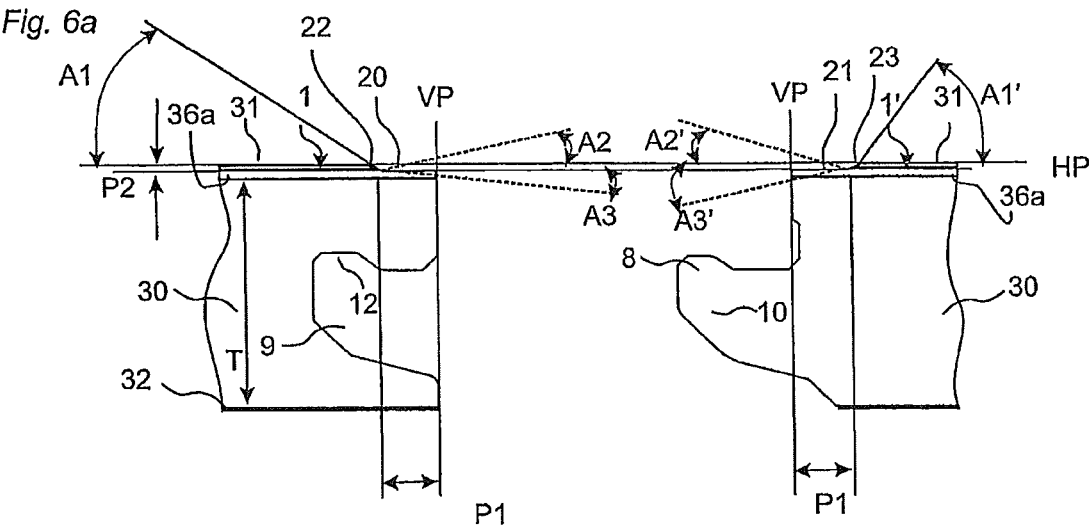
FIGS. 6a-c show different embodiments of the invention.
Figure 6B:
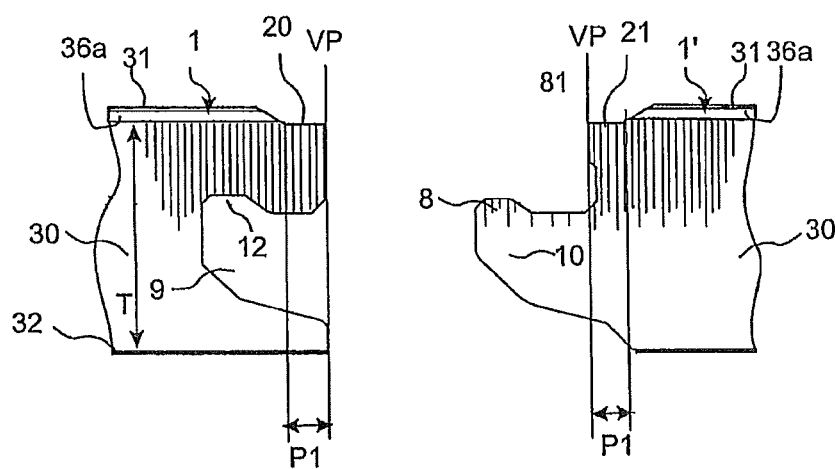
Figure 6C:
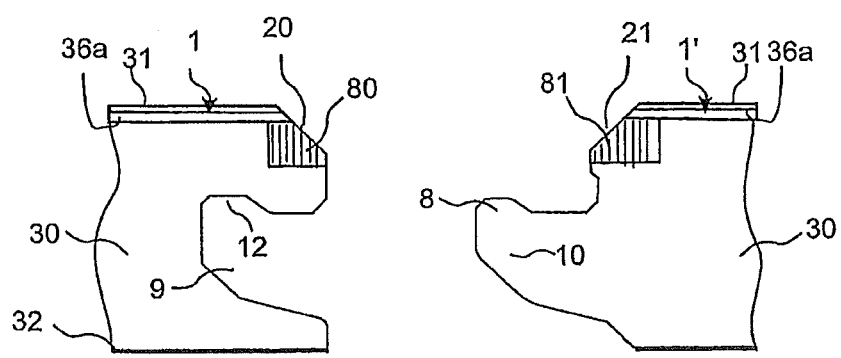

FIGS. 6a-c illustrate embodiments of the invention.

The machining of the decorative joint portion can according to FIG. 6a extend to a depth P2, counting from the horizontal plane HP, which is at least 0.1 times the thickness of the surface layer 31. The sum of the extent P1 of the machining in the joint portions of the two floorboards 1, 1', counting from the vertical plane VP and inwards to the floorboards, according to FIGS. 6a and 6b is preferably also about 0.1 times the floor thickness T or greater. Such a decorative joint portion is suitable to resemble a joint gap between, for instance, two wood blocks. The uncovered reinforcing layer 36a according to FIG. 6a or the uncovered core surface in the two joint edges, according to FIG. 6b, VP, may also have an extent counting from the vertical plane, which corresponds to about 0.25 times the thickness T of the floorboard. Such a decorative joint portion is suitable to resemble the joint between two stone slabs. A plurality of alternatives are feasible.

The joint edges between two adjoining floorboards 1, 1' may, for instance, have one or more decorative joint portions which together have a visible width of 0.2 to 10 mm. In FIG. 6a, two adjoining edges form in the joined position a decorative groove with a bottom surface 20, 21 and lateral surfaces 22, 23. The lateral surfaces 22, 23 have an angle A1, A1' to the horizontal plane HP which is greater than the angle A2, A2', A3, A3' of the bottom surface 20, 21. The angle of the lateral surfaces may preferably vary between 20 and 120 degrees and the angle of the bottom surface may preferably vary between 0 and 30 degrees. The lateral surfaces and the bottom surface may have, but need not have, the same angle. A specific feature of this embodiment is that the lateral surface 22, 23 has a higher angle than the bottom surface 20, 21. It is advantageous if the lateral surfaces have an angle of 40-60 degrees. This reduces tool wear. It is also advantageous if the bottom surface 20, 21 is essentially parallel to the horizontal plane. By essentially parallel is meant an angle of about 0-10 degrees to the horizontal plane. It is also advantageous if the bottom surface 20, 21 is plane or inclined downwards away from the surface at an angle A3, A3'.

FIG. 6c shows how bevelled and reinforced joint portions 80, 81 can be formed by grooves being made in the core before or after lamination and where these grooves are then filled with a decorative filling material 80, 81 which then is formed by machining to decorative and preferably moisture-proof portions.

By selecting a filling material which in terms of colour corresponds to the decoration of the surface, it is possible to provide bevelled joint edges which as to appearance resemble, for instance, homogeneous wooden flooring with bevelled joint edge portions. Similar grooves can also be made between the joint edge portions. As an alternative to filling material, wood, wood-based boards, plastic, compact laminate and the like may be used. These materials can be joined in the grooves.

FIGS. 7a-c show how grooves with bottom surfaces 20a, 20b according to the invention can be manufactured and positioned optionally on the surface of the floorboard between the decorative joint portions 20. Preferably, such grooves 20a, 20b as intend to resemble the decorative joint portions 20 at the joint edges of the floorboard should have a width which is 2 times the width of the joint portion 20 so that all decorative joint portions and grooves will have the same appearance once the floorboards are joined.

Figure 8:
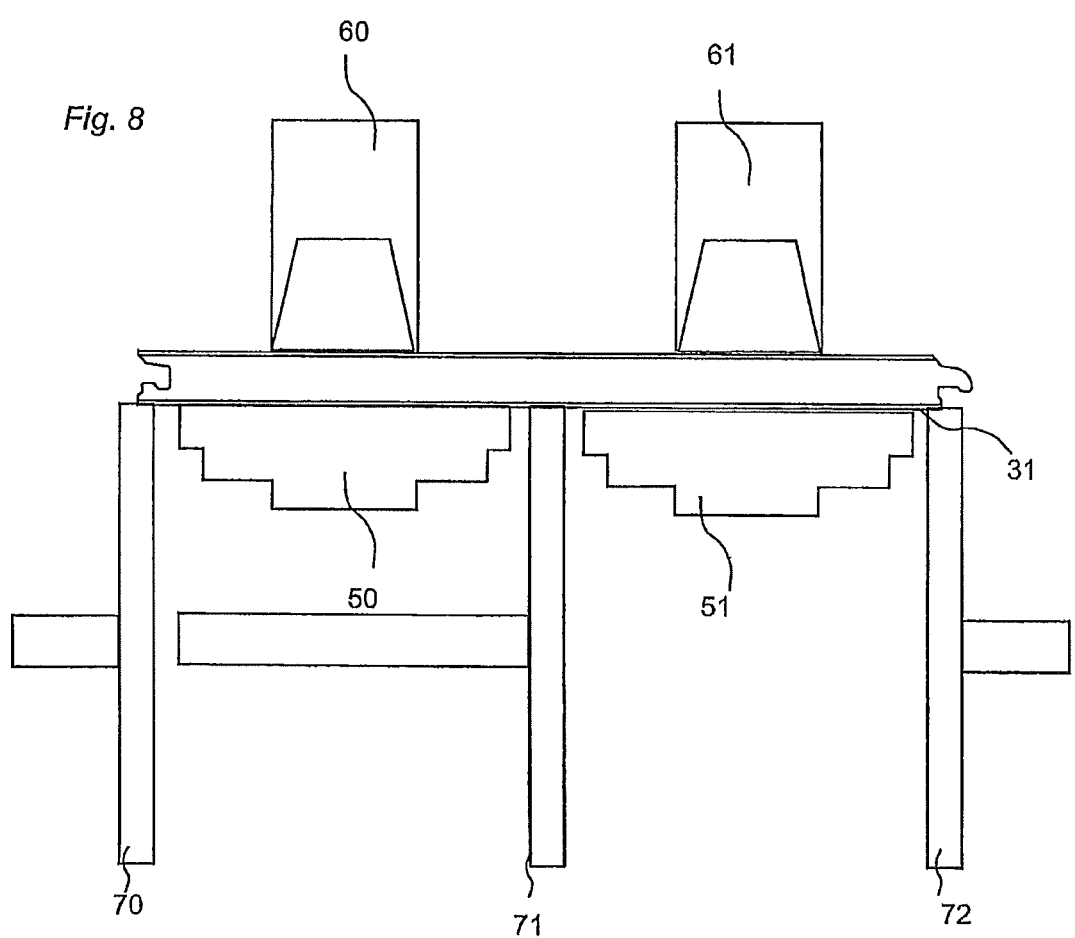
FIG. 8 illustrates a manufacturing method for making decorative grooves.

FIG. 8 shows how the decorative joint portions according to FIG. 7 can be manufactured. The outer joint edge portions 20 of the floorboard are manufactured by the floorboard being passed through milling machines fixed between chains 50, 51 and bands 60, 61, as a rule first through a first machine that machines the long sides, and then through a second machine that machines the short sides. The tools with their respective milling motors 70, 72 are according to prior art located outside the chains and machine the joint edges. As a rule, use is made of up to five tools on each side, which at different angles machine the joint edges. To rationally manufacture a floorboard according to the invention with decorative grooves between the joint edges, it must be possible to perform machining of the surface of the floorboard also between the chains 50, 51. According to the invention, this is most conveniently made by one or more milling motors being provided with extended tool shafts so that the milling motors can be positioned outside the chain while at the same time the tool 71 performs machining between the chains. This is advantageous in particular when manufacture is to be performed of decorative grooves which are close to the joint edges. Separate milling motors can also be placed between the chains 50, 51. For rational manufacture of a floorboard with a mechanical locking system and with decorative joint portions at the joint edges and/or between the joint edges, it is as a rule necessary for the number of machining motors and tools on each side to be increased to six. Manufacture can be still more rational if the number of tools is increased to between six and eight on each side. The tool 71 which machines the groove in the surface of the floorboard between the joint edges should operate vertically, i.e. perpendicular, to the surface of the floorboard. The tools machining the joint edges can operate vertically, horizontally or at different angles.

Manufacture of floorboards, especially laminate flooring, according to these preferred methods is not known and does not exist today. It goes without saying that the decorative grooves can also be made in a separate operation, but this causes a higher cost and considerably greater variation than in the case where all parallel decorative grooves are made in the same machine in one operation. The accuracy of the grooves in depth and side can with the preferred manufacturing method according to FIG. 8 be made with a tolerance of a few hundredths of a millimeter.

FIGS. 9a-d show how a decorative groove 133 can be formed on merely one edge of two joined floorboards 1, 1'. This embodiment has several advantages. The number of tools can be reduced and the joint gap will be less visible. In FIG. 9a, the lateral surfaces 22 and 23 are perpendicular to the horizontal plane HP and the bottom surface 21 is parallel to the surface. In FIG. 9b, the lateral surfaces 22 and 23 are undercut and angled according to lines 11a, 11b. An angled lateral surface 22 may conceal a possible play between the upper joint edges of the floorboards. FIG. 9c shows an example of an angled bottom 21 and lateral surface 23. FIG. 9d shows merely a horizontal joint system. The decorative groove 133 has an angled 22 and a rounded 23 lateral surface. All preferred embodiments of the joint edges according to FIGS. 9a-9d can be combined. It is obvious that other angles, radii, depths and widths can be used within the scope of the invention.

FIG. 10a shows a floorboard with a decorative groove on one long side 133a and one short side 133b. FIG. 10b shows a decorative groove on merely one long side 133a. FIGS. 10c and 10d show a floor which consists of the floorboards according to the Figures above. FIG. 10e shows two parallel grooves 135, 133a and 134, 133b on the long sides and short sides. In this embodiment, the grooves have different widths. The floorboard has in this embodiment also an elliptic groove 136 in the surface.

It is obvious that all the preferred embodiments can be freely combined with each other and that the grooves can be given optional designs in terms of number, width, depth, shape in all three dimensions etc. The floorboards can be designed so that they can be connected, for instance, long side against long side, short side against short side or long side against short side. The joint systems and/or the decorative grooves can be mirror-inverted and laying can take place in herringbone pattern with floorboards that need not necessarily have parallel opposite sides.

Figure 11A:
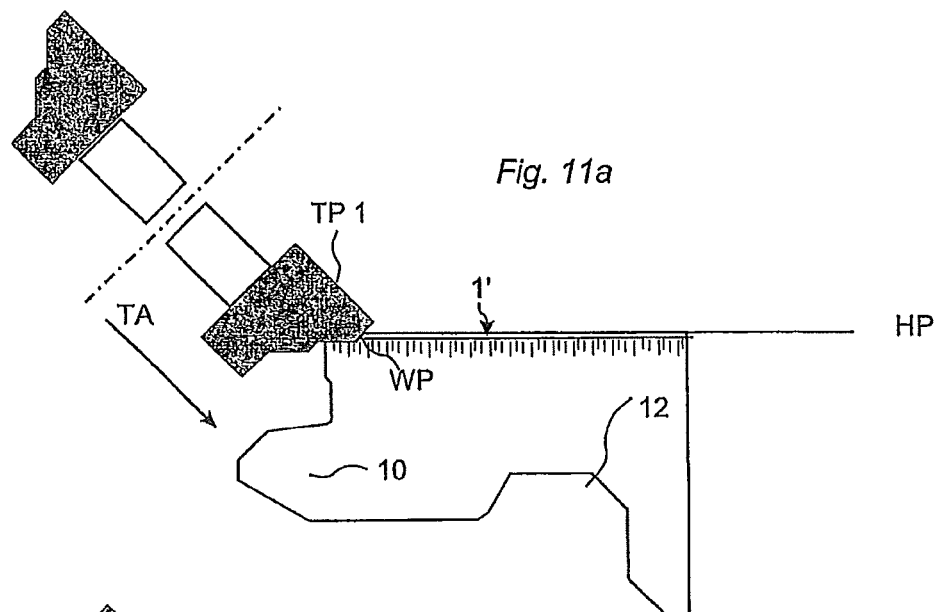
FIGS. 11a-b illustrate manufacture of decorative joint portions.
Figure 11B:
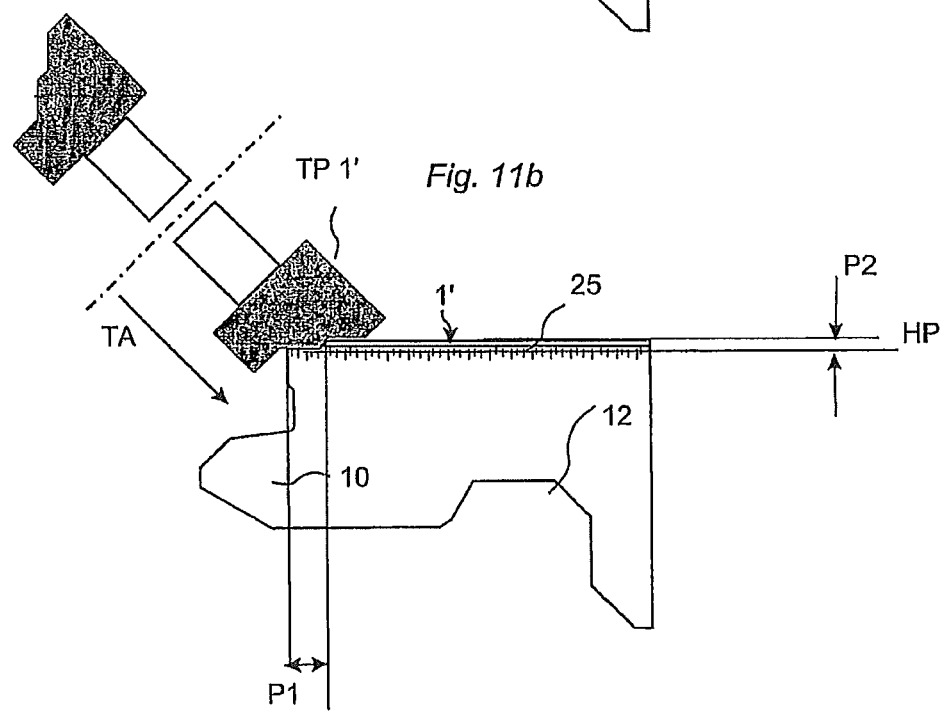

FIG. 11a shows how the decorative joint portion can be formed in, for instance, a laminate floor by means of a diamond tool TP1 which in this embodiment operates at an angle TA of about 45 degrees to the horizontal plane HP. The aluminium oxide in the wear layer of the laminate causes great wear in the point WP. This problem can be reduced if the form of the tool is stepped. When part of the diamond is worn out, the tool can be moved to position TP1' according to FIG. 11b. The tool can also be moved vertically in small steps of e.g. some hundredths of a millimeter. The depth of the groove will then vary, but differences of a few tenths of a millimeter are hardly visible, especially in cases where the decorative joint portion is formed on only one of the two adjoining edges. The tool TP1 can operate at other angles. In this embodiment, the thickness of the surface layer is about 0.2 mm, the width P1 of the groove about 1 mm, the depth P2 of the groove about 0.3 mm and the depth of penetration of the melamine 25 under the surface layer between 0.2 and 0.4 mm. Such a decorative joint portion is, inter alia, suitable for use in floorboards having a format corresponding to parquet blocks and being laid in parallel rows, diamond pattern or herringbone pattern. In these cases, decorative joint edges may be convenient to arrange on only one long side and one short side of each floorboard. As a rule, the core is impregnated with a colour pigment which is darker than the surface of the floorboard.

The invention claimed is:

1. A method for making a floorboard, or a floor element that is to be divided into at least two floorboards, the method comprising:
   making a core from a sheet shaped material, from which a part of a locking system for vertical locking of the floorboards is to be formed,
   impregnating and/or staining the core surface with a substance at least in portions which in the completed floorboard will constitute a joint edge of the completed floorboard,
   arranging a surface layer on the core surface,
   forming joint edges in the core to form the part of the locking system; and
   removing a part of the surface layer so that said core surface is uncovered and forms a stained and/or impregnated surface portion above the locking system, the stained and/or impregnated surface portion being essentially parallel to the upper side of the floorboard.

2. A method as claimed in claim 1, wherein the stained and/or impregnated surface portion forms a decorative joint portion adjacent to an edge portion of the floorboard, such that the joint edge comprises a decorative joint portion and an edge portion.

3. A method as claimed in claim 1, wherein the method further comprises:
   impregnating and/or staining with said substance the core surface at least in portions between joint edges, wherein
   removing a part of the surface layer makes a groove on the core surface, and the groove is parallel with the joint edges.

4. A method as claimed in claim 1, wherein the method comprises:
   arranging said surface layer onto the core surface by laminating said surface layer to said core surface.

5. A method as claimed in claim 1, wherein removing the part of said surface layer is performed by machining using a stepped tool to expose the core surface.

6. A method as claimed in claim 5, wherein the exposed core surface being impregnated and said substance is petroleum-based wax, mineral oil and the like, optionally with pigments added.

7. A method as claimed in claim 1, wherein the floorboards are quadrilateral and have a surface layer of laminate and the stained and/or impregnated joint portion at all joint edges.

8. A method as claimed in claim 1, wherein the floorboards are quadrilateral and have a surface layer of laminate and the stained and/or impregnated joint portion at only two joint edges.

9. A method as claimed in claim 1, wherein the floorboards are quadrilateral and have a surface layer of laminate and the stained and/or impregnated joint portion on only one long side and one short side.

10. A method as claimed in claim 1, wherein the method further comprises:
    forming a connector for joining a floorboard with a previously installed floorboard by inward angling and/or snapping-in to a locked position.

11. A method for making a floorboard, or a floor element that is to be divided into at least two floorboards, the method comprising:
    making a core from a sheet shaped material, from which a part of a locking system for vertical locking of the floorboards is to be formed,
    impregnating and/or staining the core surface with a substance at least in portions which in the completed floorboard will constitute a joint edge of the completed floorboard,
    arranging a surface layer on the core surface, and
    removing a part of the surface layer so that said core surface is uncovered and forms a stained and/or impregnated surface portion essentially parallel to the upper side of the floorboard,
    wherein the method further comprises:
    impregnating and/or staining with said substance the core surface at least in portions between joint edges, wherein
    removing a part of the surface layer makes a groove on the core surface, and the groove is parallel with the joint edges,
    wherein the core comprises high density fibreboard, medium density fibreboard, particle board or plywood.

12. A method as claimed in claim 1, wherein the surface layer comprises laminate or veneer.

13. A method as claimed in claim 1, wherein the method comprises:
    impregnating and/or staining with said substance the whole core surface.

14. A method as claimed in claim 10, where the method further comprises forming at least a part of a locking system for vertical locking in the core.

15. A method for making a floorboard, or a floor element that is to be divided into at least two floorboards, the method comprising:
    making a core from a sheet shaped material, from which a part of a locking system for vertical locking of the floorboards is to be formed,
    impregnating and/or staining the core surface with a substance at least in portions between portions which in the completed floorboard will constitute a joint edge of the completed floorboard,
    arranging a surface layer on the core surface,
    forming joint edges in the core to form the part of the locking system; and
    making a groove parallel with the joint edges by removing the surface layer between joint edges of the floorboard on the core surface above the locking system, and removing the surface layer so that said core surface above the locking system is uncovered and forms a stained and/or impregnated surface portion of the groove which is essentially parallel to the upper side of the floorboard.

16. A method as claimed in claim 1, wherein the substance penetrates the core surface and extends into the core.

17. A method as claimed in claim 16, further comprising:
    utilizing a vacuum underneath the core to facilitate penetration of the substance into the core.

18. A method as claimed in claim 3, wherein the core comprises high density fibreboard, medium density fibreboard, particle board or plywood.

19. A method as claimed in claim 18, wherein the core comprises high density fibreboard.

20. A method as claimed in claim 15, wherein the core comprises high density fibreboard, medium density fibreboard, particle board or plywood.

21. A method as claimed in claim 20, wherein the core comprises high density fibreboard.

22. A method as claimed in claim 11, wherein the core comprises high density fibreboard.

23. A method as claimed in claim 11, wherein the method further comprises uncovering said core surface and forming the stained and/or impregnated surface portion essentially parallel to the upper side of the floorboard in an area of the floorboard that is adapted to be exposed when the floorboard is connected to a substantially identical floorboard.

\* \* \* \* \*